US009600411B2

(12) United States Patent
Foti

(10) Patent No.: US 9,600,411 B2
(45) Date of Patent: Mar. 21, 2017

(54) SYSTEM AND METHOD FOR DETERMINING AN OBJECT'S LIFETIME IN AN OBJECT ORIENTED ENVIRONMENT

(75) Inventor: David A. Foti, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 550 days.

(21) Appl. No.: 13/077,338

(22) Filed: Mar. 31, 2011

(65) Prior Publication Data
US 2012/0197944 A1   Aug. 2, 2012

Related U.S. Application Data

(60) Provisional application No. 61/438,019, filed on Jan. 31, 2011.

(51) Int. Cl.
G06F 7/00 (2006.01)
G06F 12/02 (2006.01)
(52) U.S. Cl.
CPC ................ G06F 12/0253 (2013.01)
(58) Field of Classification Search
None
See application file for complete search history.

(56) References Cited

U.S. PATENT DOCUMENTS

| 5,241,673 | A | 8/1993 | Schelvis |
| 5,392,432 | A | 2/1995 | Engelstad et al. |
| 6,363,403 | B1 * | 3/2002 | Roy et al. |
| 6,381,738 | B1 | 4/2002 | Choi et al. |
| 6,502,110 | B1 | 12/2002 | Houldsworth |
| 6,795,836 | B2 | 9/2004 | Arnold et al. |

(Continued)

FOREIGN PATENT DOCUMENTS

EP   1489518 A1   12/2004

OTHER PUBLICATIONS

"Notification of Transmittal of the International Search Report and the Written Opinion of the International Searching Authority, or the Declaration," International Filing Date: Mar. 31, 2011, International Application No. PCT/US2011/000576, Applicant: The Math Works, Inc., Date of Mailing: Nov. 23, 2011, pp. 1-11.

(Continued)

*Primary Examiner* — Thu Nga Nguyen
(74) *Attorney, Agent, or Firm* — Cesari and McKenna, LLP; Michael R. Reinemann

(57) ABSTRACT

A system and method determines an object's lifetime. An object lifecycle engine may work with an object oriented environment. As objects are created, an object graph may be constructed having one or more roots. A root record graph may be constructed, and edges of the root record graph may point in an opposite direction than the edges of the object graph. As objects, entities, and references are added, removed, or deleted from within the environment, the object graph and the root record graph may be updated. A root finder may search the root record graph to determine whether a given root record is no longer rooted. If a root record is no longer rooted, then the object associated with that root record may be determined to be unreachable and at the end of its lifetime. If the root finder search is performed when references are removed, then objects may be destroyed in a deterministic manner.

34 Claims, 14 Drawing Sheets

(56) References Cited

U.S. PATENT DOCUMENTS

| | | | |
|---|---|---|---|
| 6,874,074 B1 | 3/2005 | Burton et al. | |
| 6,976,087 B1* | 12/2005 | Westfall | H04L 12/5695 370/238 |
| 7,051,333 B1 | 5/2006 | Nylander et al. | |
| 7,051,338 B1 | 5/2006 | Foti et al. | |
| 7,181,745 B1 | 2/2007 | Foti et al. | |
| 7,237,237 B2* | 6/2007 | Foti | 717/158 |
| 7,584,452 B1 | 9/2009 | Johnson | |
| 7,725,904 B2 | 5/2010 | Foti et al. | |
| 7,849,470 B2 | 12/2010 | Nylander et al. | |
| 7,958,790 B2 | 6/2011 | Gleghorn et al. | |
| 8,238,269 B2* | 8/2012 | Rousseau et al. | 370/256 |
| 2004/0181562 A1* | 9/2004 | Findeisen | 707/206 |
| 2004/0181782 A1* | 9/2004 | Findeisen | 717/130 |
| 2007/0226688 A1 | 9/2007 | Foti et al. | |
| 2007/0288892 A1 | 12/2007 | Foti et al. | |
| 2008/0114804 A1 | 5/2008 | Foti et al. | |
| 2008/0127064 A1 | 5/2008 | Orofino et al. | |
| 2008/0162549 A1 | 7/2008 | Foti et al. | |
| 2008/0312984 A1* | 12/2008 | Molloy et al. | 705/7 |
| 2009/0077121 A1 | 3/2009 | Foti et al. | |
| 2009/0077536 A1 | 3/2009 | Foti et al. | |
| 2009/0150430 A1 | 6/2009 | Foti et al. | |
| 2009/0183139 A1 | 7/2009 | Foti et al. | |
| 2009/0271460 A1 | 10/2009 | Inoue | |
| 2010/0223631 A1 | 9/2010 | Foti et al. | |
| 2011/0066638 A1* | 3/2011 | Shinjo et al. | 707/769 |

OTHER PUBLICATIONS

Wilson, Paul R., "Uniprocessor Garbage Collection Techniques," Memory Management, International Workshop IWMM Proceedings, Sep. 17, 1992, pp. 1-42.

McGarrity, Stuart, "Introduction to Object-Oriented Programming in MATLAB®," MATLAB® Digest, The MathWorks, Inc., www.mathworks.com, Feb. 2009, p. 1-6.

Richter, Jeffrey, "Garbage Collection: Automatic Memory Management in the Microsoft .NET Framework," MSDN Magazine, Microsoft, http://www.msdn.microsoft.com/en-us/magazine/bb985010.aspx, Nov. 2000, pp. 1-8.

"Fundamentals of Garbage Collection: .NET Framework 4," MSDN Magazine, Microsoft, http://www.msdn.microsoft.com/en-us/library/ee787088.aspx, printed from web on Jan. 20, 2011, pp. 1-9.

"MATLAB News & Notes—Objectively Speaking," The MathWorks, Inc., Winter 1999, pp. 1-2.

"MATLAB® 7: Object-Oriented Programming," The MathWorks, Inc., Oct. 2008, pp. i-xiv, 1-1 to 1-18, 2-1 to 2-46, 3-1 to 3-36, 4-1 to 4-32, 5-1 to 5-26, 6-1 to 6-50, 7-1 to 7-22, 8-1 to 8-46, 9-1 to 9-34, 10-1 to 10-20, 11-1 to 11-24 and Index-1.

U.S. Appl. No. 12/135,403, filed Jun. 9, 2008 by David A. Foti for Object Management Using Cyclic Path Information, all pages.

* cited by examiner

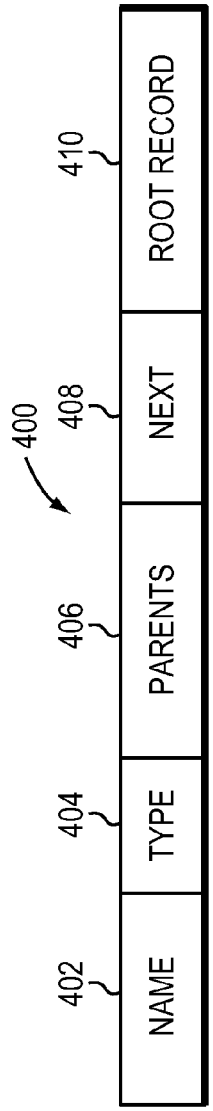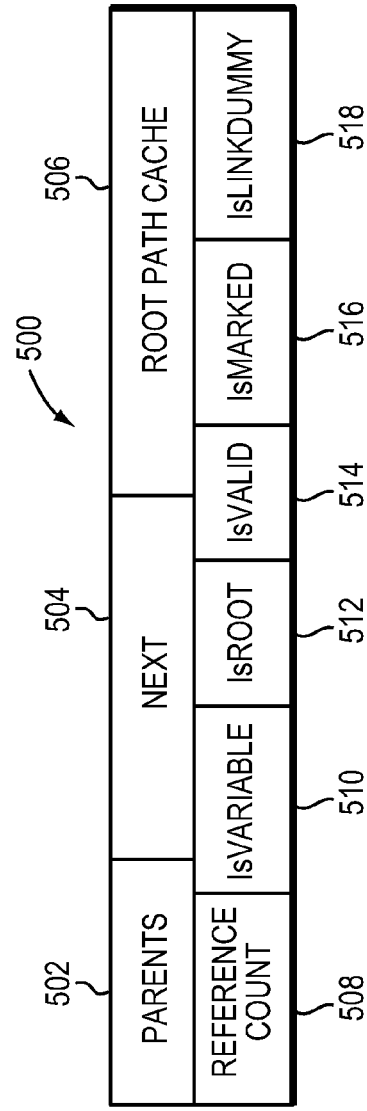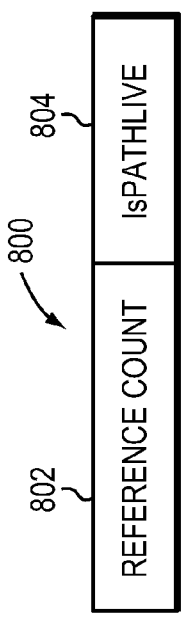

SYSTEM AND METHOD FOR DETERMINING AN OBJECT'S LIFETIME IN AN OBJECT ORIENTED ENVIRONMENT

CROSS-REFERENCE TO RELATED APPLICATIONS

The present application claims the benefit of U.S. Provisional Patent Application Ser. No. 61/438,019, which was filed on Jan. 31, 2011, by David A. Foti and Jianzhong Xue for a SYSTEM AND METHOD FOR DETERMINING AN OBJECT'S LIFETIME IN AN OBJECT ORIENTED ENVIRONMENT and is hereby incorporated by reference in its entirety.

BRIEF DESCRIPTION OF THE DRAWINGS

The invention description below refers to the accompanying drawings, of which:

FIG. 4 is a schematic illustration of an object graph node data structure in accordance with an embodiment of the invention;

FIG. 5 is a schematic illustration of a root record node data structure in accordance with an embodiment of the invention;

FIG. 8 is a schematic illustration of a Path Cache data structure in accordance with an embodiment of the invention;

DETAILED DESCRIPTION OF AN ILLUSTRATIVE EMBODIMENT

Figure 1:
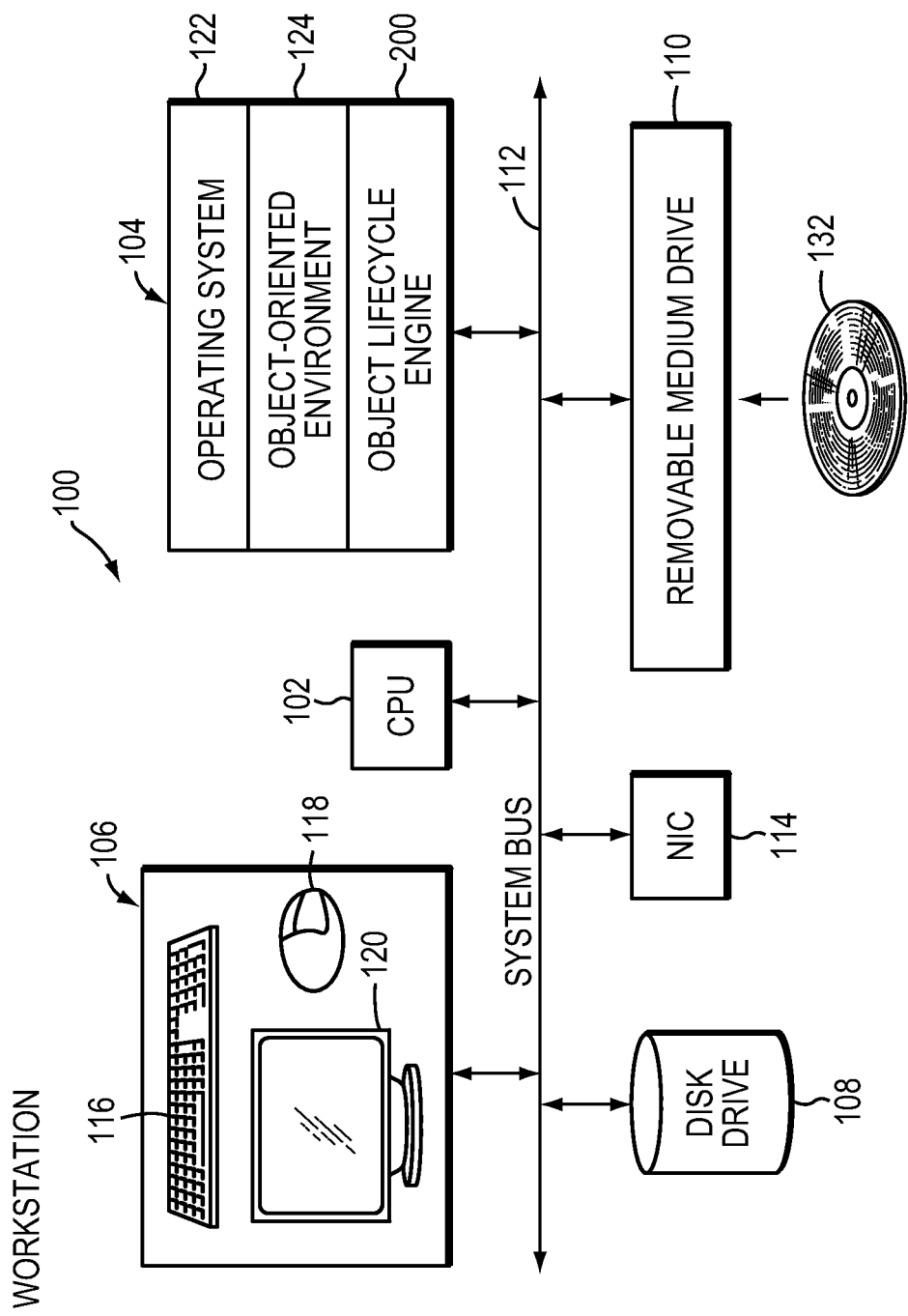
FIG. 1 is a schematic block diagram of a data processing system suitable for use with the present invention.

In an object-oriented environment, such as a programming environment, objects are created, and these objects interact with other objects in the environment. Objects are specific instances of a class, which describes a set of common characteristics. Objects have behaviors that are common to all objects of a class, and these behaviors are implemented through methods. Each object typically encapsulates data and operations. Objects interact with each other and with other entities of the object oriented environment via object interfaces such as function calls and events.

Classes define those characteristics or elements that are common to all instances of the class. Classes may define many kinds of characteristics or elements. Some of these characteristics are defined by functions or interfaces to functions. A function is sometimes called a method, operation, or operator. A function may take inputs and produces outputs. A function that belongs to the class typically has unrestricted access to class elements while functions outside the class have more restricted access. This limitation of access is commonly referred to as encapsulation.

Other class characteristics are defined as fields or properties that hold data such as numeric values, arrays, tables, functions, delegates, other objects, and references to other objects.

Another example of a class characteristic is an event or message. An event allows a class or object to broadcast information about some special change or occurrence that may be of interest to other objects or code executing in the system. One example of an event is the press of a button. Another example is a zero-crossing in an object used for numerical simulation.

In object oriented systems, objects are typically created through a process called construction in which initial values may be assigned to any state variables associated with the objects, such as the values of object data elements (also known as fields or properties). Object construction frequently happens by calling a function often called a constructor. The constructor function may have the same name as the class or may have another name. The call to the constructor may be made using the same syntax as calling an ordinary function or method or may use special syntax or special operators that indicate that a new object is to be constructed. The constructor may take arguments that are used to create an instance having specific property values. This is one way that a program or system may create many objects that share the characteristics defined by their class, but also differ from other instances of the same class.

When objects are constructed and afterward, they may consume resources such as system memory, file handles, sockets, handles to devices, slots in tables, other objects, etc. The very existence of objects may also affect how systems behave. For example, an object may register one of its methods to be invoked in response to some event from the system or another object. Because objects impact their environment through interactions with the system and other objects and through the resources they consume, it is important for an object oriented system to also provide a means for objects to be destroyed. Object destruction typically involves the termination of object interactions and the release of system and other resources. Generally object oriented systems may require that programs be written to explicitly destroy objects, or they may automate the destruction process or they may automate the destruction process under certain circumstances.

When systems automate object destruction, there are different approaches that can be taken to achieve automation. Generally, the automated system provides some mechanism to detect that an object is no longer being used by the program, and should be destroyed. In some systems such as the MATLAB® programming language and application from The MathWorks, Inc. of Natick, Mass., objects are destroyed at the point where no program is capable of accessing the object. In other systems, such as the Java Virtual Machine from Oracle Corp. of Redwood City, Calif. or the Microsoft .NET Framework from Microsoft Corp. of Redmond, Wash., objects are destroyed through a process known as garbage collection. The garbage collection process destroys unreachable objects that are determined to be unreachable some time after they became unreachable.

All automated systems for object destruction remove some burdens on programmers that can improve the quality and efficiency of programs. However, garbage collections systems also introduce burdens on programmers, and possibilities for defects in programs. Because objects are not destroyed at a deterministic point in program execution and because objects typically remain after no longer being reachable, and because these objects can impact the system, these impacts are non-deterministic and can be a source of defects or bugs. Such defects can be difficult to reproduce and debug because garbage collection performance is not always repeatable. Programmers often want to be aware of how their objects use resources and rely on deterministic ordering of object destruction, a complicating factor in designing objects for garbage collection systems. A deterministic system for destroying objects is desirable to avoid such bugs, and to ease the task of designing and implementing objects. A deterministic system should also be efficient, e.g., by minimizing the cost of determining that an object is unreachable. Commonly owned U.S. Pat. No. 7,237,237 for Designating an Object for Destruction, which is hereby incorporated by reference in its entirety, describes a deterministic system employed in some versions of the MATLAB® product that may exhibit a relatively high runtime performance cost for performing cycle detection. In particular, creating and destroying certain data structures such as stacks, lists, and trees can have performance of order $O(n^2)$ rather than the expected $O(n)$ where n is the number of nodes in the data structure. The present invention significantly improves performance of these operations.

Overview

An embodiment of the invention relates to a system and method for determining an object's lifetime. The system may include an object lifecycle engine that works with an object oriented environment, such as an object oriented programming environment. The object lifecycle engine may include an object graph builder, a root record graph builder, a root finder, and a cache management engine. As objects are created in the object oriented environment, the object lifecycle engine may be notified, and the object graph builder may construct an object graph. In an embodiment, the object graph may be a directed graph in which a first type of node may represent the objects created in the environment and a second type of node may represent other entities, such as local or global variables, that may reference the objects. The object lifecycle engine also may be notified when a reference is established between an entity, such as a variable, and an object, and/or when a reference is established between two objects. In response, the object graph builder may create edges in the object graph that represent these references among the objects and entities. The object graph thus may include a node for each object created in the environment, and a node for each variable or other entity that references one or more objects. The object graph also may include an edge for each reference between two objects or between an object and an entity. One or more nodes of the object graph may represent a root of the object graph. A root may be a node that only has edges leading away from it. The root may not have any edges leading to it.

The root record graph builder may construct a root record graph, which may be separate from the object graph. The root record graph also may be a directed graph, and its structure may largely mirror the structure of the object graph. However, the edges of the root record graph may point in an opposite direction than the edges of the object graph. That is, while the edges of the object graph may point away from the root and toward child or leaf nodes, the edges of the root record graph may point from the child or leaf nodes to the root node or nodes. The nodes of the root record graph may be root records created by the root record graph builder. In an embodiment, for each node of the object graph, the root record graph builder constructs a root record corresponding to that object graph node. Furthermore, for each edge constructed between two nodes of the object graph, the root record builder may create a corresponding edge between the two root records of the root record graph that correspond to those object graph nodes. As mentioned, however, the edges of the root record graph may point in the opposite direction as compared to the edges of the object graph. The lifecycle engine maintains an association between each object and its root record.

As objects, entities, and references are removed or deleted from within the object oriented environment, the object graph builder may update the object graph, and the root record graph builder may update the root record graph. More specifically, when an object or variable is deleted a corresponding node of the object graph, and a corresponding node of the root record graph may be removed. In addition, the references to and from the deleted node may be removed from the object and root record graphs. Furthermore, as references among objects and entities are deleted or removed, the edges of the object graph and the root record graph that correspond to those deleted or removed references may be removed. In an embodiment, changes to the object graph and root record graph may be made in the same order as the operations that trigger those changes. For example, the changes to the graphs may occur in lockstep order with the occurrence of the respective commands or actions in the object oriented environment.

As described herein, the object graph and the root record graph may provide an efficient, automatic, and deterministic way of determining when an object has reached its end of lifetime. A reference to an object that originates, not from another object, but from outside another object, such as from a local or global variable, may be referred to as an external reference. Furthermore, an object may be said to be externally reachable if it is possible to reach the object by following a path that begins with an external reference. An object that is no longer reachable from an entity, such as a variable, of the object oriented environment may be considered to have reached its end of lifetime, as it may no longer be possible to access or reach such an object. The object may then be destroyed, and the resources allocated to or reserved by that object may be released. This condition, by which an object becomes unreachable, may be detected by the root finder, which may search the root record graph.

In particular, after a reference, an object or an entity is deleted or removed from within the object oriented environment, and that change has been reflected in the object and root record graphs, the root finder may examine the root record graph to determine whether one or more objects have, as a result, become unreachable. In an embodiment, the root finder searches the root record graph to determine whether a given root record is no longer linked, e.g., by one or more edges, to a root of the root record graph. If a root record is no longer linked to a root, then the object associated with that root record may be determined to be unreachable and thus at the end of its lifetime. The object lifecycle engine may notify the object oriented environment of this condition, and the environment may take appropriate action, such as, for example, destroying the object, and releasing the resources allocated to and/or reserved by the object.

The cache management engine of the object lifecycle engine may cache information about paths from the nodes of the root record graph to the one or more roots of the root record graph. By caching such information, the root finder may only need to calculate such a root path once for any given node of the root record graph. Thereafter, instead of re-calculating a root path for a given node, the root finder may perform a cache lookup. As edges in the root record graph are removed, the cache management engine also may invalidate cached path information that relied on the removed edges. In an embodiment, this may cause the root finder to calculate one or more new root paths, which in turn may be cached.

In an embodiment, certain kinds of objects may not be allowed to be referenced from multiple variables or other objects. In this case, root records for these objects may be simpler because they may have a single edge. There may be a family of root records that implement a common interface, but have different data structures optimized for the particular needs of the object associated with the root record.

A data processing or computer system may include multiple threads of execution and a thread may be allowed to access its own graph of objects. In an embodiment, several threads of execution may each have distinct sets of object and root record graphs where each thread is not allowed to interact with objects from another thread.

Data Processing System

FIG. 1 is a schematic illustration of an exemplary computer or data processing system 100 for implementing and utilizing an embodiment of the invention. The computer system 100 may include one or more elements, such as a central processing unit (CPU) 102, a main memory 104, user input/output (I/O) 106, a disk drive 108, and a removable medium drive 110 that are interconnected by a system bus 112. The computer system 100 may also include a network interface card (NIC) 114. The user I/O 106 may include a keyboard 116, a mouse 118, and a display 120.

The main memory 104 may store a plurality of libraries or modules, such as an operating system 122, and one or more application programs or applications running on the operating system 122, including an object oriented system or environment 124. Furthermore, as described herein, an object lifecycle engine 200 may be loaded on the main memory 104. The object lifecycle engine 200 may be part of, or may be in communicating relationship with, the object oriented environment 124.

The removable medium drive 110 may accept and read a computer readable medium 126, such as a CD, DVD, floppy disk, solid state drive, tape, flash memory or other medium. The removable medium drive 110 may further write to the computer readable medium 126.

Suitable computer systems may include, for example, personal computers (PCs), workstations, laptops, tablets, palm computers, electronic readers, smartphones, and other portable computing devices. Suitable operating systems 122 may include the Windows series of operating systems from Microsoft Corp. of Redmond, Wash., the Linux operating system, the MAC OS® series of operating systems from Apple Inc. of Cupertino, Calif., and the UNIX® series of operating system, among others.

The computer system 100 of FIG. 1 is intended for illustrative purposes only, and the present invention may be used with other computer systems, data processing systems or computational devices. The present invention may also be used in a networked, e.g., client-server, computer architecture, or a public and/or private cloud computing arrangement, among others.

As indicated above, a user or developer, such as an engineer, scientist, programmer, etc., may utilize the keyboard 116, the mouse 118 and the computer display 120 of the user I/O 106 to operate the object oriented environment 124.

Suitable object oriented systems or environments include high-level technical computing environments, such as the MATLAB® and Simulink® technical computing environments from The MathWorks, Inc. of Natick, Mass., and in the system described U.S. Patent Publication No. 2008/0127064 for a System and Method for Using Stream Objects to Perform Stream Processing in a Text-Based Computing Environment, which is hereby incorporated by reference in its entirety. Other object oriented systems or environments include the Java Virtual Machine from Oracle Corp., the Microsoft .NET Framework from Microsoft Corp., and the Smalltalk programming language, among others.

The MATLAB® technical computing environment is a math-oriented, textual programming environment for digital signal processing (DSP) design, among other uses. The SIMULINK® technical computing environment is a graphical, block-based environment for modeling and simulating dynamic systems, among other uses. A user may operate the MATLAB® and Simulink® technical computing environments to conduct algorithm exploration and development, data visualization, and dynamic system simulation. For example, a user may utilize the Simulink environment to create one or more block diagrams where the blocks may represent portions of the dynamic system.

Oftentimes, an engineer or developer may run an object oriented environment, such as the MATLAB® and Simulink® technical computing environments, continuously for many months at a time, or even longer, while conducting on-going algorithm exploration or development, among other tasks. For example, the engineer or developer may create multiple projects some or all of which may be kept up and running. During this time, numerous objects may be created, and each object may consume resources, such as system resources. At least some of the system resources may be of limited supply. If the resources allocated to or reserved by objects that are no longer in use are not released, system performance may suffer. Furthermore, the operations, functions or modeling actions performed by the user with the MATLAB® and Simulink® environments may be carried out over a long period of time.

Object Lifecycle Engine

Figure 2:
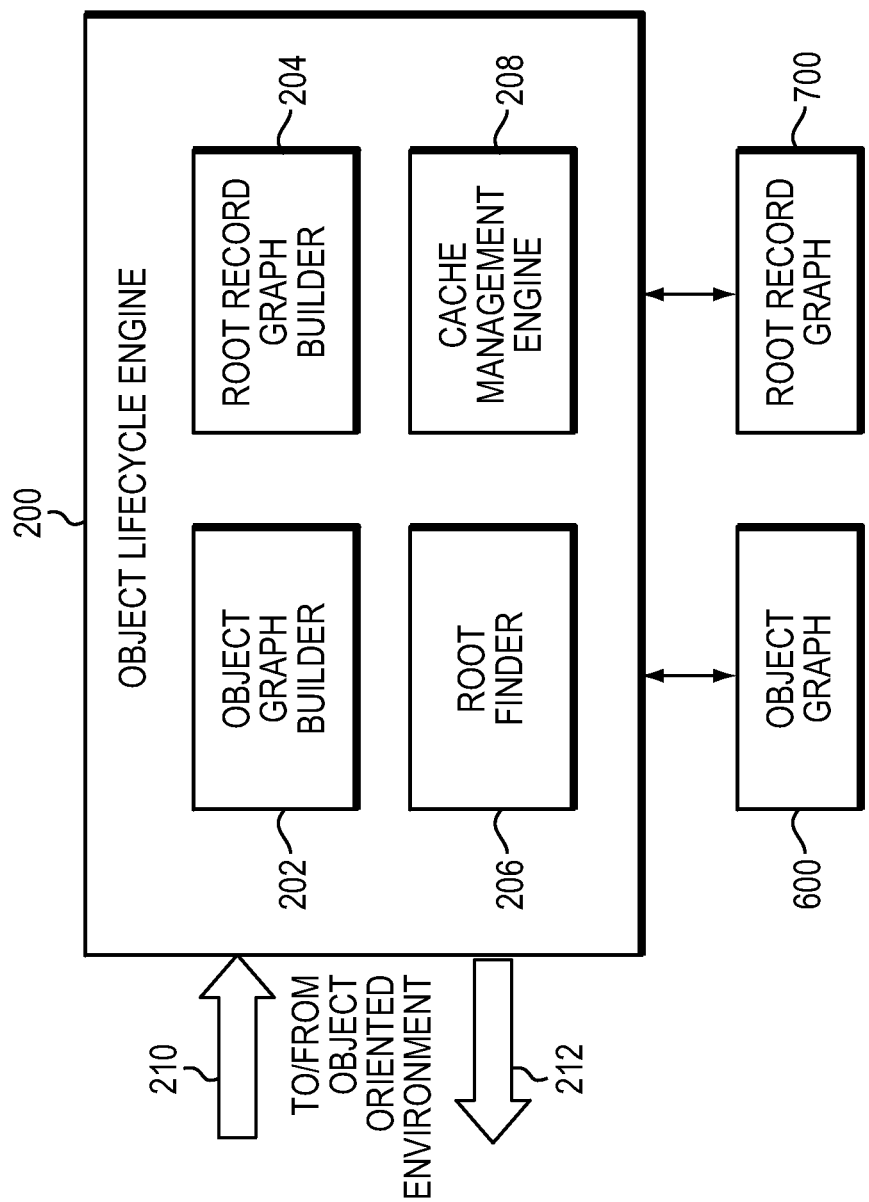
FIG. 2 is a function block diagram of an object lifecycle engine in accordance with an embodiment of the invention.

FIG. 2 is a schematic, functional block diagram of an embodiment of the object lifecycle engine 200. The object lifecycle engine 200 may include a plurality of components or modules. Specifically, the object lifecycle engine 200 may include an object graph builder module 202, a root record graph builder module 204, a root finder module 206, and a cache management engine 208. The object lifecycle engine 200 may receive one or more notifications from the object oriented environment 124 (FIG. 1), as indicated by arrow 210. Exemplary notifications may include object creation notifications, non-object entity creation notifications, reference creation notifications, object deletion notifications, non-object entity deletion notifications, and reference deletion notifications, among others. The object lifecycle engine 200 also may issue notifications to the object oriented environment 124, as indicated by arrow 212, such as object end of lifetime notifications.

As discussed herein, the object graph builder 202 may construct one or more object graphs, such as object graph 600. The root record graph builder 204 may construct one or more root record graphs, such as root record graph 700. The root finder 206 may search graphs 600, 700, to locate one or more roots of graphs 600, 700. The cache management engine 208 may cache path information calculated by the root finder 206, and to manage that cache information.

The object lifecycle engine 200, including the object graph builder 202, the root record graph builder 204, the root finder 206, and the cache management engine 208, may each comprise registers and combinational logic configured and arranged as sequential logic circuits. In an embodiment, the object lifecycle engine 200 is implemented through one or more software modules or libraries containing program instructions pertaining to the methods described herein. The instructions may be stored in main memory 104 and/or on a computer readable media, such as computer readable medium 126, and executable by one or more elements, such as CPU 102. For example, the object graph builder 202, the root record graph builder 204, the root finder 206, and the cache management engine 208 may each be implemented through one or more software modules or libraries. Other computer readable media may also be used to store and execute these program instructions. In alternative embodiments, various combinations of software and hardware, including firmware, may be utilized to implement the present invention.

As mentioned above, the object lifecycle engine 200 may be built into, and thus constitute a part of, the object oriented environment 124. In another embodiment, it may be built into the operating system 122. Alternatively, engine 200 may be a separate component from the environment 124 and operating system 122, as illustrated in FIG. 1. The environment 124 and the object lifecycle engine 200 may communicate with each other through a Local Procedure Call (LPC) messaging system, a Remote Procedure Call (RPC) messaging system, one or more Application Programming Interfaces (APIs), or one or more object interfaces, among other communication techniques.

Creating Object and Root Record Graphs

Figure 3A:
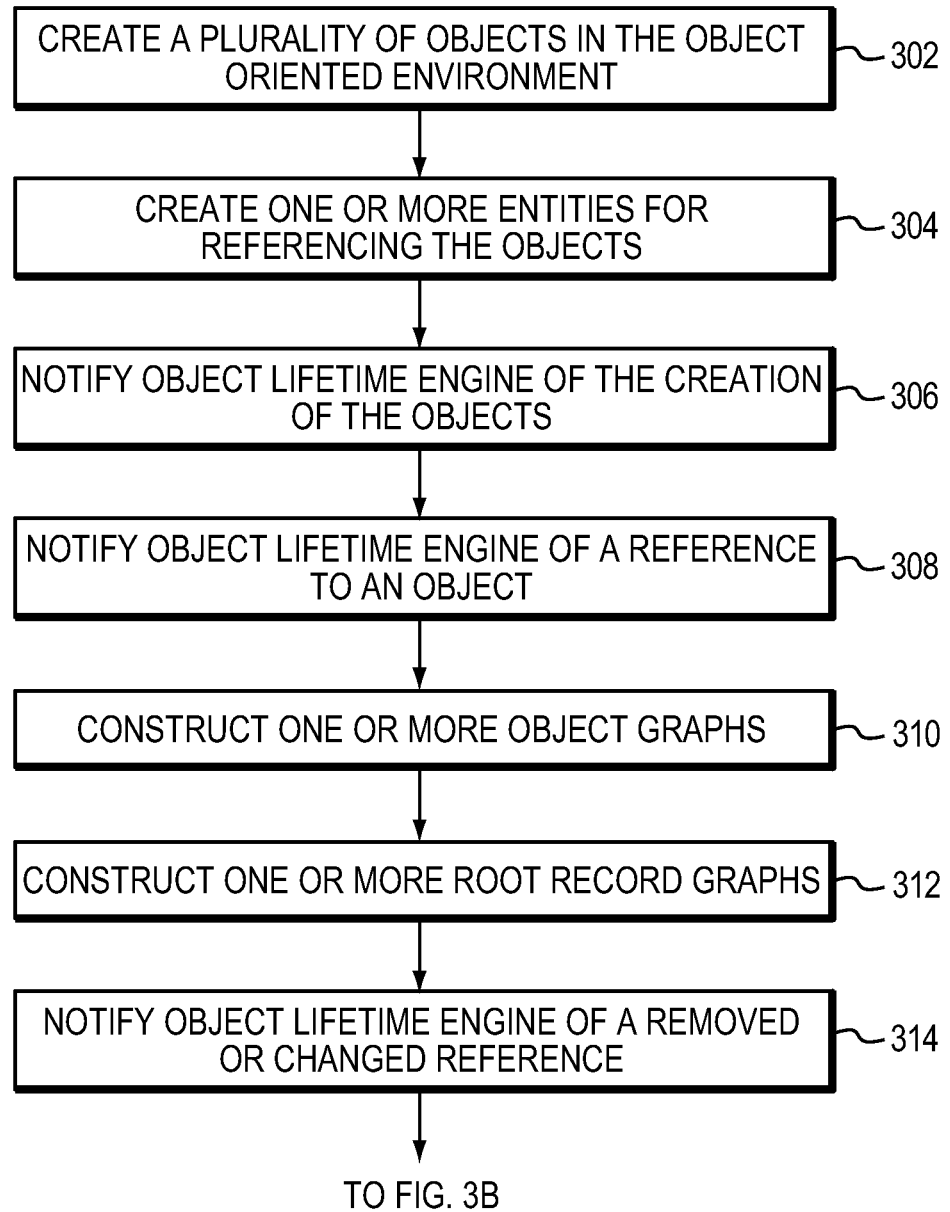
FIGS. 3A to 3C is a flow diagram of a method in accordance with an embodiment of the invention.

FIG. 3 is a flow diagram of a method in accordance with an embodiment of the invention. Objects may be created in the object oriented environment 124, as indicated at block 302. In addition, one or more other non-object entities that are capable of referencing an object, such as a global or local variable, may also be created in the environment 124, as indicated at block 304. The environment 124 may notify the object lifecycle engine 200 of the creation of an object, as indicated at block 306. In an embodiment, the environment 124 may notify the object lifecycle engine 200 as such object is created. The environment 124 also may notify the object lifecycle engine 200 after a reference is established to or from an entity and an object, and after a reference is established among objects, as indicated at block 308. In response to these notifications, the object lifecycle engine 200 may construct an object graph 600, as indicated at block 310, and a root record graph 700, as indicated at block 312.

In an embodiment, graphs 600, 700 are constructed by the object graph builder 202 and the root record graph builder 204, respectively. The object graph 600 and the root record graph 700 may each be implemented as a directed graph, such as a directed acyclic graph (DAG). The object graph 600 and the root record graph 700 may each include a plurality of nodes interconnected by edges. The object lifecycle engine 200 may store the object graph 600 and the root record graph 700 in memory, such as main memory 104. The graphs 600, 700 may be implemented, for example, through linked lists.

It should be understood that objects as well as entities that are capable of referencing objects may be created in the object oriented environment 124 in a number of different ways. For example, a user may create an object in a graphical manner by utilizing a graphical modeling system. Here, the user may select a desired block type from a palette of available blocks, and add an instance of the selected block type to a block diagram window or canvas. Likewise, for example, a user may also create an object in a textual manner, e.g., by entering a command for constructing an object in a command line interface of the environment 124. In an embodiment, an entity, such as a variable, may represent a place to put an object, and provides a way to reach that object.

The object oriented environment 124 may support a text-based command, such as:

x=myObject;

which may result in the creation of the variable 'x' that refers to a constructed instance of the class 'myObject'. The object oriented environment 124 may further support a command, such as:

x.prop_1=myOtherObject;

which may result in a property of the object 'myObject' being set to another object, i.e., an instance of 'myOtherObject' class. That is, the object 'myObject' now references the object 'myOtherObject'.

Suitable objects for use with the present invention may comply with the MATLAB object system from The MathWorks, Inc. An entity, such as a variable, may be created by declaring the variable in accordance with the syntax and semantics of the environment 124. An example of a type of variable is a cell array, which may be an array of other arrays. A cell array may thus reference one or more objects.

In addition to being created in response to user input, an object or an entity may be created programmatically. For example, a script, routine, or function may be run by the object oriented environment 124, and a result may be the creation of one or more objects and the establishment of references among the objects. In addition, a block diagram that creates objects and references may be executed.

As discussed herein, the object graph builder 202 may construct a node of the object graph 600 for each object and for each entity created in the environment 124. A node may be represented through one or more data structures having one or more information storage elements, and may be stored in a memory, such as main memory 104. These elements may be implemented as fields of a data structure. FIG. 4 is a schematic illustration of an embodiment of an object graph node data structure 400. In particular, the node data structure 400 may have a name field 402 that stores a name or identifier of the object or entity to which the node corresponds. The name may be the same as the object's or variable's name as assigned in the object oriented environment 124. The node data structure 400 also may include a type field or flag 404 specifying whether the node corresponds to an object or to an entity, such as a variable.

In addition, the node data structure 400 may have one or more pointer fields, such as a Parents field 406, a Next field 408, and a Root Record field 410. The Parents and Next fields 406, 408 may each store pointers that point to a node data structure 400 of another node of the object graph 600. The Root Record field 410 may point to a node of the root record graph 700 that corresponds to the same entity or object as the object graph node data structure 400. When a reference is established between a first object or entity and a second object or entity, the Next field 406 of the node data structure 400 for the first object or entity may be loaded with a pointer that points to the node data structure 400 for the second object or entity. Similarly, the Parents field 406 of the node data structure for the second object or entity may be loaded with a pointer to the node data structure 400 for the first object or entity.

In this way, as objects and entities are created in the object oriented environment 124, and as references among these objects and entities are established, the object graph builder 202 constructs and updates the object graph 600, which provides a representation of that information.

The root record graph builder 204 also may construct a node of the root record graph 700 for each object and entity created in the environment 124. A node of the root record graph 700 also may be represented as one or more data structures having one or more information storage elements, implemented as fields, and stored in a memory. FIG. 5 is a schematic illustration of a root record graph node data structure 500. The root record graph node data structure 500 may include a plurality of fields or flags. In particular, it may include a Parents field 502, a Next field 504, a Path_Cache field 506, a Reference count field 508, an is_Variable flag 510, an is_Root flag 512, an is_Valid flag 514, an is_Marked flag 516, and an is_Link_Dummy flag 518.

In an embodiment, nodes of the object graph 600 and root record graph 700 for objects and/or non-object entities may only be created by the object lifecycle engine 200 after a reference from the respective object and/or non-object entity to an object is established in the objected oriented environment 124. For example, if a user creates an object or an entity, such as a variable, in the object oriented environment 124, a node for that object or entity may not be created in either the object graph 600 or the root record graph 700 unless and until a reference to or from that object or that variable and an object is established.

As mentioned, the object oriented environment 124 may notify the object lifecycle engine 200 as references are established among objects and non-object entities in the environment 124. In response to a reference being established to or from an object, the object graph builder 202 may create an edge in the object graph 600 corresponding to that reference. Similarly, the root record graph builder 204 may create an edge in the root record graph 700 for that reference.

In an embodiment, assignment to variables may notify the object lifecycle engine 200 by invoking a method on the engine 200 that takes a reference to the variable and a reference to the value assigned to the variable. Similarly, when a property or array element is assigned, the assignment operation may invoke a method on the object lifecycle engine 200, and pass a reference to the object or array being assigned into and a reference to the value being assigned.

In an embodiment, the object lifecycle engine 200 may provide a method to create a new root record representing a root reference. The system or environment 124 may invoke this method to create a root record for each root in the system where a variable in an executing function is one example of a root.

In an embodiment, the object lifecycle engine 200 may only be notified when the value being assigned to a variable or a property may possibly contain references to other entities. If the value is known to be a leaf value, there may be no need to record its location in the object or root record graphs 600, 700, because a reference count may be sufficient to determine when such a value can be destroyed.

In an embodiment, a just-in-time (JIT) compiler may be employed to convert a program from source code into machine-executable code or virtual-machine executable code. The just-in-time compiler may remove invocation of the object lifecycle engine 200 to establish object graph nodes and root record nodes if the JIT compiler is able to determine the point where an object must be destroyed based on definition and use analysis of the program code being compiled. In other embodiments, the JIT compiler may be replaced by a more conventional compiler or a conventional interpreter.

To the extent the environment 124 supports different kinds of references, such as strong references and weak references, the root record graph builder 204 may only record strong references in the root record graph 700, because strong references, by definition, prevent objects from being destroyed, whereas weak references do not.

In an embodiment, a reference may be represented by a separate edge within the object graph 600 and the root record graph 700. That is, if a first object or entity, which already references a second object, references the second object or entity a second time, then a separate edge may be constructed in the object graph 600 and in the root record graph 700 for such a reference. In an embodiment, if a root record has multiple edges connected to the same other root record, these edges may be represented using a reference count.

References among objects and non-object entities may be created in a number of different ways within the object oriented environment 124. For example, a user may create a reference between two objects in a graphical manner by utilizing a graphical modeling system. For example, when the user adds a block to a subsystem, a reference may be created between the subsystem and the block. Also, when the user includes a first model in a second model, e.g., through a model reference block, a reference may be created from the second model to the first model, which may be called a referenced model or a submodel. With the object oriented graphical modeling system, a block, a subsystem, and a model may each correspond to an object. A user may also create a reference in a textual manner, e.g., by entering a command for assigning a variable to an object, or assigning a property of a first object to a second object. In addition, references, like objects and entities, may be created programmatically.

Figure 6:
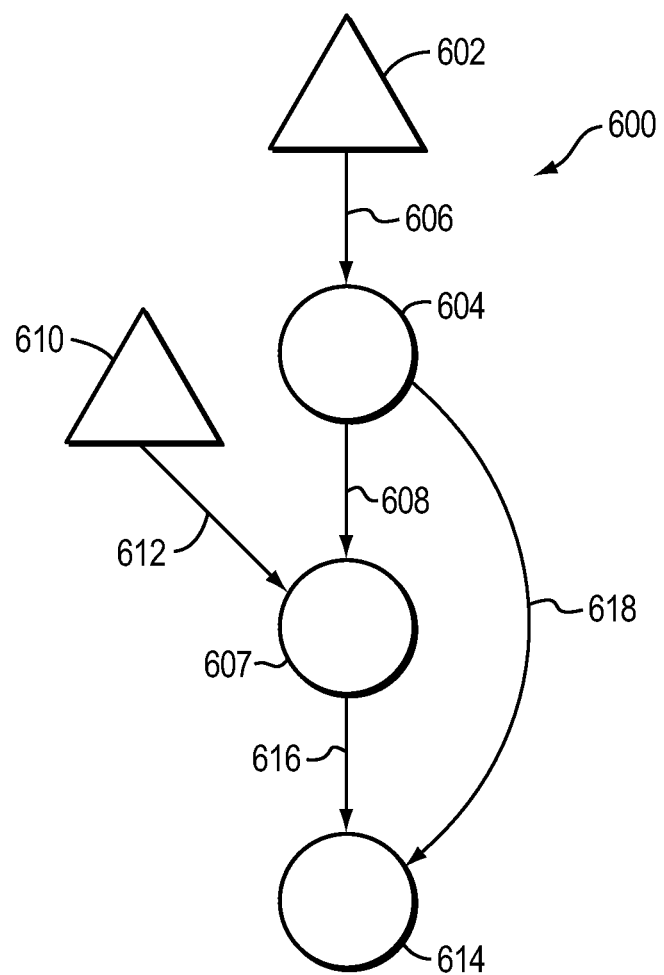
FIG. 6 is a schematic illustration of an object graph in accordance with an embodiment of the invention.

FIG. 6 is a schematic illustration of the object graph 600 created by the object graph builder 202. Object graph 600 may include a plurality of nodes interconnected by a plurality of edges. As discussed herein, a node of the object graph may represent either an object or an entity that references (or is referenced by) an object. Furthermore, an edge may represent a reference between a first object and a second object, between an object and an entity, between an entity and an object, or between a first entity and a second entity. In addition, an object graph may include one or more roots.

The object graph 600 illustrated in FIG. 6 may be constructed in response to the following sequence of commands entered by a user in the object oriented environment 124:

$$x=myObject; \qquad (1)$$

$$x.prop\_1=mySecondObject; \qquad (2)$$

$$y=x.prop\_1; \qquad (3)$$

$$y.prop\_1=myThirdObject; \qquad (4)$$

$$x.prop\_2=y.prop\_1; \qquad (5)$$

Suppose that myObject, mySecondObject, and myThirdObject are handle classes available within the environment. Handle classes may be classes whose instances are referred to by reference rather than by value. Objects of handle classes may use a handle to reference objects of the class. A handle may be a pointer or some other value or object that identifies a particular instance of a class. Assignment of a handle from one variable to another is one example of an operation that may copy a handle. Passing a handle as a parameter to or from a function is another example of an operation that may copy a handle. When a handle is copied, the handle itself (e.g. the pointer or other identifier) may be copied, but not the data stored in the object's properties or data members. The object-oriented environment 124 may support non-handle classes, which may be called value classes and may also be known by a variety of names such as structure or struct depending on the environment. When a value object is copied, the object's data may also be copied, and the new object may be independent of changes to the original object. In an embodiment, the root record graph builder 204 may create root records for objects of handle classes, but not for objects of value classes. However, if a value object contains a handle class object, then the root record graph builder 204 may create a root record for this value object.

If a variable holds a handle class instance and a second variable is assigned the value of the first variable, then both variables refer to the same object. The first command creates the variable 'x', creates an instance of myObject, and establishes a reference from the variable 'x' to the object. Upon entry of this command, e.g., by the user entering the statement at a Command Line Interface (CLI) and selecting the return key, the object oriented environment 124 notifies the object lifecycle engine 200 of the creation of the variable 'x', the creation of the myObject instance, and the establishment of the reference from the variable 'x' to the myObject instance. In response, the object graph builder 202 constructs a first node 602, a second node 604, and an edge 606 extending from the first node 602 to the second node 604.

The second command establishes a reference from a property of the myObject instance to the mySecondObject instance. Again, the object oriented environment 124 notifies the object lifecycle engine 200 upon the entry of the second command, e.g., by the user. The object graph builder 202 responds by modifying or updating the object graph 600. In particular, the object graph builder 202 adds node 607, which represents the mySecondObject instance, and an edge 608 from node 604, which represents the myObject instance, to node 607, which represents the mySecondObject instance. The edge 608 shows the relationship between the property of the myObject instance to the mySecondObject instance.

The third command creates the variable 'y', and establishes a reference from the variable 'y' to an instance of mySecondObject. The object oriented environment 124 notifies the object lifecycle engine 200 upon entry of the third command, and, in response, the object graph builder 202 modifies the object graph 600. In particular, the object graph builder 202 adds node 610, which represents the variable 'y', and adds an edge 612 from node 610 to node 607, which represents the mySecondObject instance.

The fourth command causes the object graph builder 202 to create a new object, an instance of myThirdObject, and establishes a reference from a property of the mySecondObject instance to the myThirdObject instance. The environment 124 notifies the object lifecycle engine 200 upon the entry of the fourth command, and, in response, the object graph builder 202 modifies the object graph 600. In particular, the object graph builder 202 creates a node 614, which represents the myThirdObject instance, and a new edge 616, which represents the reference from node 607 to node 614.

The fifth command establishes a reference from a property of the myObject instance to the instance of 'myThirdObject. The environment 124 notifies engine 200 upon entry of the fifth command, and the object graph builder 202 adds a new edge 618 from node 604 to node 614.

As shown, the object graph 600 may be in the form of a DAG, having one or more roots. The roots of the object graph 600 correspond to nodes 602, 610. For purposes of illustration, the nodes 602, 610, which represent non-object entities, i.e., variables 'x' and 'y', are shown as triangles, whereas the nodes 604, 607, and 614, which represent objects, are shown as circles. This information may be stored in the Type field 404 of the node data structure 400.

As the system or environment 124 continues to process commands entered by the user, or commands are executed programmatically, additional objects and entities may be created, and additional references may be established among the objects and entities. The object graph builder 202 modifies the object graph 600 in response to these commands or actions. As the object graph 600 is updated, the object graph builder 202 may update information stored in the object graph node data structures 400. For example, as references are established, the Parents fields 406 and the Next fields 408 of the affected nodes may be updated with pointers to the referenced nodes.

In an embodiment, changes to the object graph 600 are made in lockstep order with the execution of the associated commands or operations in the object oriented environment 124. For example, as discussed above, upon entry of a command creating or referencing an object, or removing an object or a reference to an object, the object oriented environment 124 may notify the object lifecycle engine 200 of that event. The object lifecycle engine 200 may process that notification as described herein, and return an acknowledgment to the object oriented environment 124. The acknowledgment may signal that the object lifecycle engine 200 has completed its processing of the notification. The object oriented environment 124 may further suspend its processing of any subsequent commands until it receives the acknowledgment from the object lifecycle engine 200. In particular, if the acknowledgment from the object lifecycle engine 200 itself includes a notification that an object has reached the end of its lifetime, the object oriented environment 124 may respond to that notification, e.g., by destroying the object and releasing any allocated or reserved resources before processing any further commands or operations. Accordingly, the present invention may manage object lifetimes in a deterministic manner.

In an embodiment, the object graph builder 202 may construct a plurality of separate object graphs.

Figure 7:
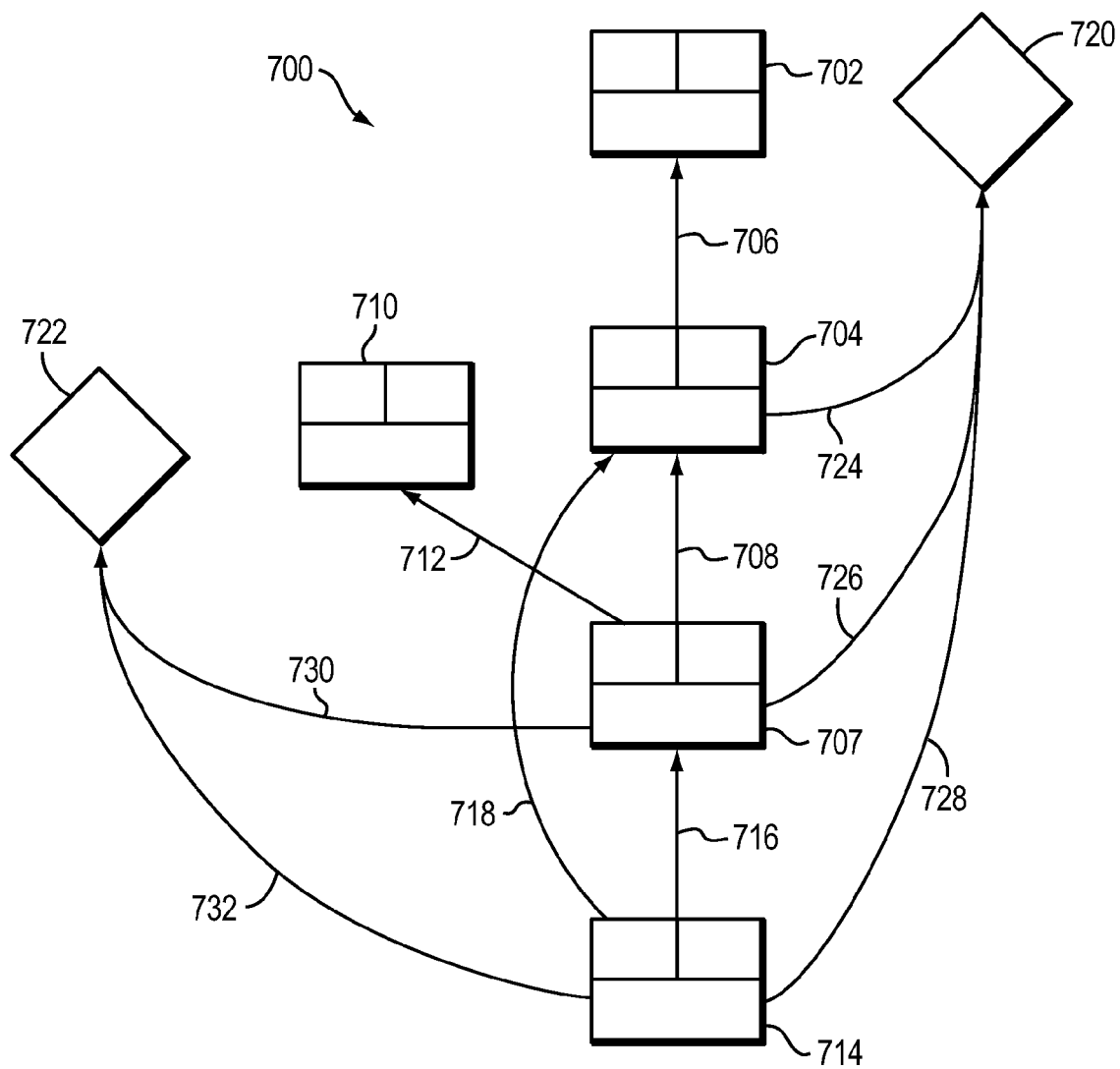
FIG. 7 is a schematic illustration of a root record graph in accordance with an embodiment of the invention.

In addition to the construction of the object graph 600, the root record graph builder 204 may construct a root record graph, such as the root record graph 700, in response to the commands or actions occurring in the object oriented environment 124. FIG. 7 is a schematic illustration of the root record graph 700 that may be created by the root record graph builder 204. The root record graph 700 also includes a plurality of nodes interconnected by a plurality of edges. As with the object graph 600, a node of the root record graph 700, which may also be referred to as a root record, may represent an object or a non-object entity created in the object oriented environment 124. Likewise, an edge of graph 700 may represent a reference between two objects, between an object and an entity, or between two entities. A root record graph, such as graph 700, also may include one or more roots.

In an embodiment, the creation and modification of the root record graph 700 closely follows the creation and modification of the object graph 600. For example, referring back to the above sequence of commands, in response to the first command, the root record builder 204 constructs root record 702, which represents the variable 'x', root record 704, which represents the object 'myObjecet', and edge 706, which represents the reference from 'x' to 'myObjecet'. While the direction of edge 606 of the object graph 600 is from node 602 to node 604, the edge 706 of the root record graph 700 points in the opposite direction, i.e., from node 704 to node 702. In response to the second command, the root record graph builder 204 modifies the root record graph 700 by adding new node 707 for 'mySecondObjecet', and new edge 708 from node 707 to node 704. In response to the third command, the root record graph builder 204 adds a new node 710 for 'y', and a new edge 712 from node 707 to node 710. In response to the fourth command, the root record graph builder 204 creates a new node 714 for 'myThirdObject', and a new edge 716, which represents the reference from 'myThirdObject' to 'my SecondObject'. In response to the fifth command, the root record graph builder 204 adds a new edge 718 from node 714 to node 704.

As shown, the root record graph 700 may also be in the form of a DAG, having one or more roots. The roots of the root record graph 700 correspond to nodes 702, 710. As described herein, the root record graph 700 may also include one or more Path Caches, such as 720, 722.

It should be understood that graphs 600, 700 are meant for illustrative purposes, and that other graphs, including graphs that may be more complex than graphs 600 and 700, may be constructed.

Root Path Caching

In an embodiment, the root finder 206 may cooperate with the cache management engine 208 to cache root path information for the root records of the root record graph 700. A root record may be considered to be rooted if the root record is a root of the root record graph 700, or if there is a path from the root record to at least one root of the root record graph 700. If the Parents field 502 of a candidate root record is empty, then the candidate root record may be considered a root of the root record graph 700. The root finder 206 may direct such a candidate root record to set its is_Root flag 512 to True, thereby storing root path information at the candidate root record itself. Furthermore, if the Parents field 502 of another root record includes a pointer to at least one other root record, then this other root record is not a root of the root record graph, and the root finder 206 may direct this other candidate root record to set its is_Root flag 512 to False. For example, as root records 702 and 710 are each roots of the root record graph 700, the is_Root flag 512 for these two root records 702, 710 may be set to True. The Parents field 502 for the other root records 704, 706, and 714 each contain a pointer to at least one other root record. Accordingly, they are not roots of the root record graph 700, and the is_Root flag 512 of these root records 704, 706, and 714 may be set to False. Thereafter, if the root finder 206 were to query root record 702, it would determine that its is_Root flag 512 is True, and therefore root record 702 may respond to the root finder 206 that it is rooted.

For those root records that are not roots of the root record graph, the root finder 206 may perform a graph traversal of the root record graph 700 starting from a candidate root record looking for a path from the candidate root record to a root of the root record graph 700. The traversal of the root record graph 700 may be a depth first search (DFS). The root finder 206 may examine the Parents field 502 of the candidate node to locate one or more parent root records. The root finder 206 may choose one of these parent root records, and examine the Parents fields 502 of the selected parent root record, and so on until the root finder 206 reaches a root of the root record graph 700. In an embodiment, the root finder 206 may mark a root record that it has encountered during a search so that it visits each root record at most once. For example, the root finder 206 may set or assert the is_Marked flag 516 when it encounters a root record during a search. At the end of a search, the is_Marked flags for all of the root records may be cleared.

Considering root record 704, for example, the root finder 206 may determine that a path from root record 704 to root record 702, which is a root of the root record graph 700, exists. Accordingly, root record 704 is also rooted. In response, the cache management engine 208 may cache this root path information in the root record graph 700. More specifically, the cache management engine 208 may create a Path Cache node, such as Path Cache node 720, in the root record graph 700. The Path Cache node may be implemented as a data structure having information storage elements, and stored in memory.

FIG. 8 is a schematic illustration of a Path Cache data structure 800. The data structure 800 may include a plurality of fields or flags, including a reference count field 802, and an is_Path_Live flag 804.

In addition to creating the Path Cache node 720, the cache management engine 208 may modify the data structure 500 for root record 704 by entering a pointer to the Path Cache node 720 into the Root Path Cache field 506. This pointer is illustrated by arrow 724 in the root record graph 700. Thereafter, if the root finder 206 queries root record 704 to see if it is rooted, the root record 704 may determine that its Root Path Cache field 506 includes a pointer to Path Cache 720. The root record 704 may respond that it is rooted, thereby freeing the root finder 206 from having to re-calculate a path from root record 704 to a root of the root record graph 700. Note that, by caching root path information, the number of times that a root path must be calculated for a candidate root record may be reduced.

The querying of root records may be performed for other root records of the root record graph 700. For example, for root record 706, it may be determined (by the root record itself or by the root finder) that the is_Root flag 512 of root record 706 is false, and that its Root Path Cache field 506 is empty. Accordingly, the root finder 206 begins calculating a root path from root record 706. When the root finder 206 reaches root record 704, the root finder 206 may check whether root record 704 caches a root path before proceeding further in the calculation of a root path. In this case, root record 704 includes a pointer to the Path Cache 720 in its Root Path Cache field 506. The root finder 206 may copy this pointer to the Root Path Cache field 506 for root record 706. In this way, root path information may also be cached at root record 706, as illustrated by arrow 726 in the root record graph 700.

For root record 714, the root finder 206 may determine that its parent, root record 706, caches a path to root 702. Accordingly, the root finder 206 may cache this root path information at root record 714. In particular, the root finder 206 may copy the pointer to Path Cache 720 from the data structure for root record 706 into the Root Path Cache 506 field for root record 714, as illustrated by arrow 728. When the root finder is asked to determine if a given root record (the starting record) is rooted, and a valid root is found, the root finder may update every root record along the path from the starting record to the found root such that each such record now points to the same Path Cache. By doing this, it is possible for the object lifecycle engine 200 to invalidate the Path Cache associated with all nodes along a given path whenever a change is made to any node along that path that might invalidate the cache for other nodes. For example, since the entire path of nodes refer to the same Path Cache, the Path Cache may be marked invalid by setting a flag in the Path Cache data structure. When a root record is found to have an invalid Path Cache, it may be treated as if the Path Cache reference were NULL, and cause the cache to be updated. Exemplary changes that may invalidate the cache include making the cached root record no longer represent a root, and removing a link from a node to its parent node where both the node and its parent node point to the same Path Cache.

The root finder can determine all of the objects between the starting record and the found root in a number of ways. One way is for the root finder to keep a stack of root records along the current path so that when a root is found the stack contains all the records between the starting record and the found root. Each record in that stack can then be assigned the same Path Cache pointer.

The object lifecycle engine 200 may use the Reference Count field 508 for a given root record to store a count of how many other root records are referring to the given root record. As a reference to the given root record is removed, the value of the Reference Count field 508 may be decremented. When the value of the Reference Count field 508 is zero, the root record graph builder 204 may destroy the given root record.

The is_Valid flag 514 of a given root record may be used to designate whether the given root record is valid or invalid. For example, if the is_Valid flag 514 is asserted, the given root record may be valid.

In an embodiment, the object graph node data structure 400 and/or the root record graph node data structure 500 may have fewer, greater or other fields.

Determining an Object's End of Lifetime

Figure 3B:
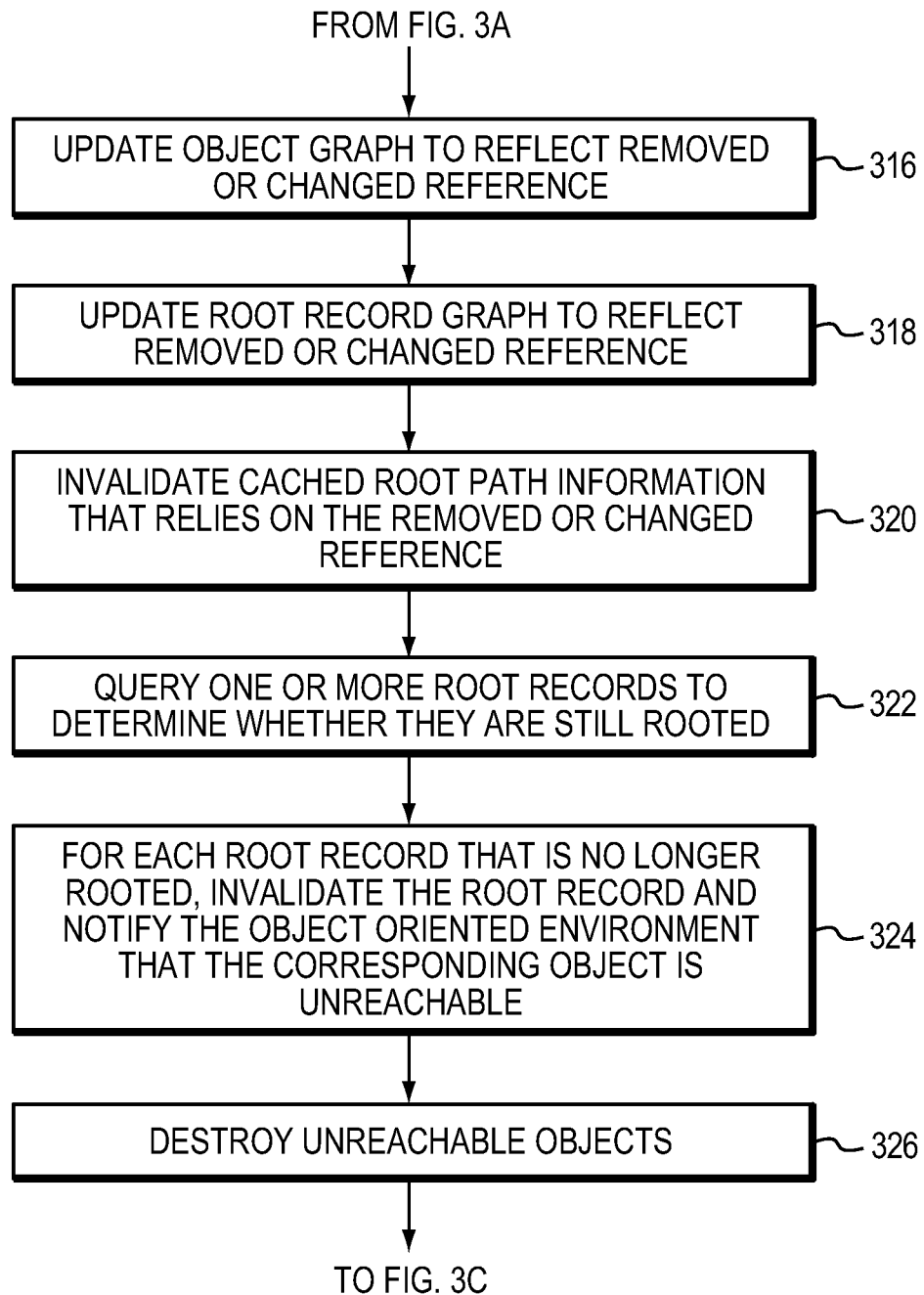

As discussed herein, notifications may be issued by the object oriented environment 124 to the object lifecycle engine 200 when objects are created, when non-object entities that reference objects are created, and when references are established among the objects and entities. In an embodiment, the object oriented environment 124 also may issue notifications to the object lifecycle engine 200 when a reference to an object is deleted or removed from within the object oriented environment 124. More specifically, when an entity, such as a variable, that references an object is removed, cleared, goes out of scope, or is changed to reference something else, such as a value, a notification of the removal of the reference to the object may be issued by the environment 124 to the object lifecycle engine 200, as indicated at block 314. In response, the object graph builder 202 may update the object graph 600 to reflect the removal of the reference to the object, as indicated at block 316 (FIG. 3B). In addition, the root record graph builder 204 may update the root record graph 700 to reflect the removal of the reference, as indicated at block 318.

Regarding the object graph 600, the object graph builder 202 locates the edge that corresponds to the removed or changed reference, and may delete that edge from the object graph 600. For example, suppose the following command is entered in the environment 124:

$$x=5; \qquad (6)$$

At command (1) mentioned above, the variable 'x' had previously been set to reference the object 'myObject'. With the entry of command (6), the reference from variable 'x' to 'myObject' is removed. The reference from variable 'x' to 'myObject' is represented in the object graph 600 by edge 606. The object graph builder 202 may remove edge 606 from the object graph 600. The object graph builder 202 may enter the object graph 600 at node 602, which represents the variable 'x', and remove edge 606 which leads from node 602 to node 604. An edge of the object graph 600 may be removed by marking the edge as invalid. If the variable 'x' had referenced other objects, the edges of the object graph 600 representing these other references would also be removed.

Regarding the root record graph 700, the root record graph builder 204 may similarly locate root record 702, which corresponds to the variable 'x', and remove edge 706, which leads to root record 702. If the root record graph 700 included other edges leading to node 702, they too would be removed.

In addition to removing edges that correspond to removed references, the cache management engine 208 may invalidate cached root path information that relies on the removed edge, as indicated at block 320. Here, the root path information represented by Path Cache 720 relies on edge 706 of the root record graph 700. Accordingly, the cache management engine 208 may invalidate the root path information by setting the Is_Path_Live flag 804 for the Path Cache 720 to False. The next time a root record that used Path Cache 720 to cache root path information is queried as to whether it is rooted, a search of the root record graph 700 may need to be performed, and the root record's cache refreshed.

In an embodiment, a Path Cache may only transition from a Live state to a not Live state. For example, if the reference represented by edge 706 of the root record graph 700 were to be subsequently re-established, the cache management engine 208 may create a new Path Cache, rather than transition Path Cache 720 from a not Live to a Live state.

In response to a reference to an object being removed or changed, and the corresponding edges of the object graph 600 and the root record graph 700 being removed, the root finder 206 may query one or more root records to determine whether those root records are still rooted, as indicated at block 322. For example, the root finder 206 may determine that edge 706, which has been removed, connected root record 704 to root record 702. The root finder 206 may thus query root record 704 to determine whether it is rooted following the removal of edge 706 from the root record graph 700. In an embodiment, the root finder 206 may only perform root searches for a root record in response to a reference being removed or going away.

Figure 9:
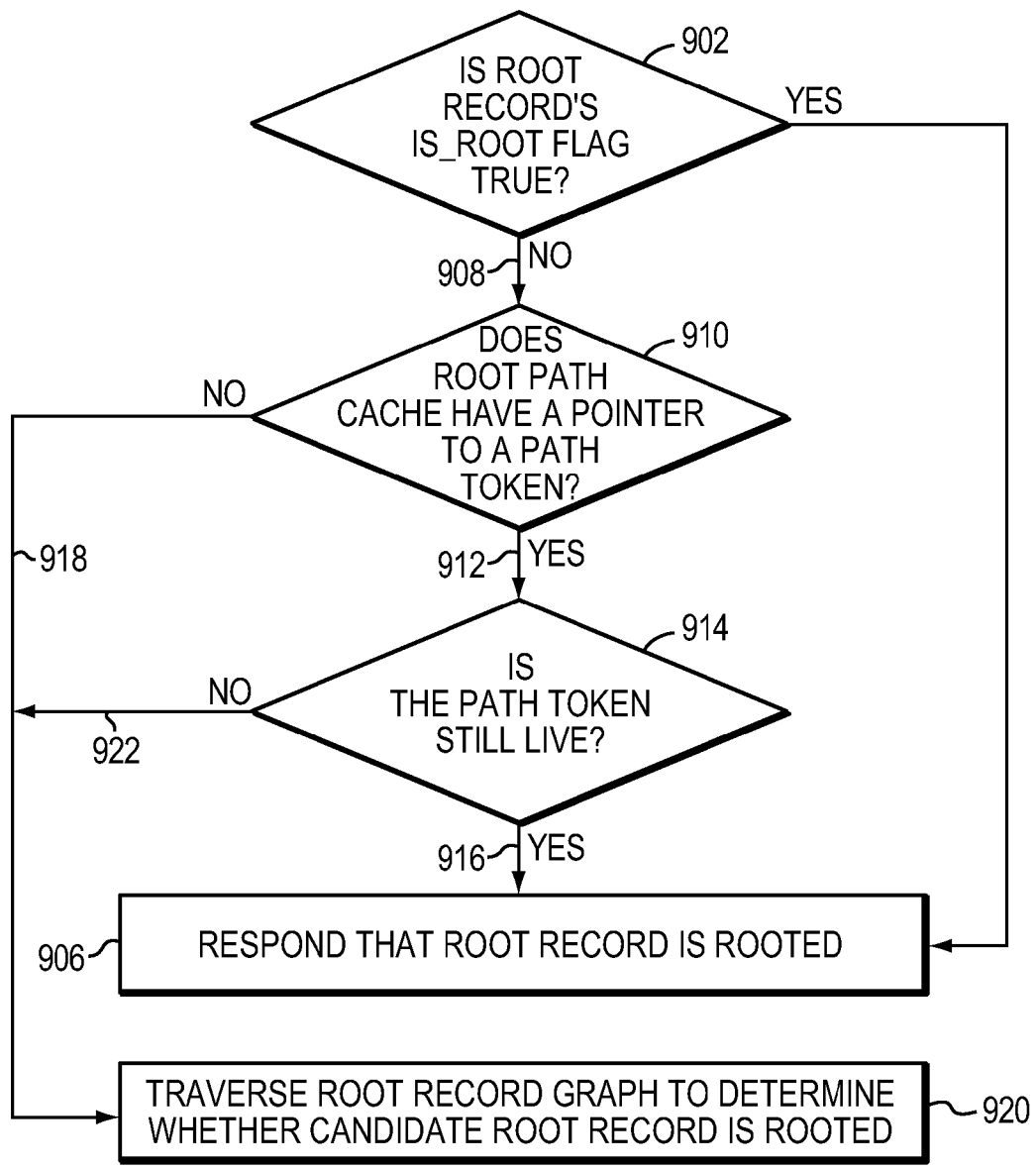
FIG. 9 is a flow diagram of a method in accordance with an embodiment of the invention.

FIG. 9 is a flow diagram of a method performed by a root record in response to a query by the root finder 206 to determine whether the root record is rooted. The root record may first check its is_Root flag to see whether it is set to True, as indicated by decision block 902. If so, the root record may respond to the root finder 206 that it is rooted, as indicated by Yes arrow 904 leading to block 906. If the is_Root flag of the root record is set to False, the root record may check its Root Path Cache field 506 for a pointer to a Path Cache of the root record graph 700, as indicated by No arrow 908 leading to decision block 910. If the Root Path Cache field 506 for the root record includes a pointer to a Path Cache, the root record may further determine whether that Path Cache is still live, as indicated by Yes arrow 912 leading to decision block 914. A root record may determine whether a Path Cache is still live by having the Path Cache check whether its is_Path_Live flag 804 is set to True. If the Path Cache's is_Path_Live flag 804 is True, the root record may respond to the root finder that it is rooted, as indicated by Yes arrow 916 leading to block 906.

Returning to decision block 910, if the root record does not have a pointer to a Path Cache, the root finder 206 may, as discussed above, traverse the root record graph 700 to determine whether there is a valid path to a root for the root record, as indicated by No arrow 918 leading to block 920. Similarly, if the root record has a pointer to a Path Cache, but the Path Cache is not live, the root finder 206 may traverse the root record graph 700 to determine whether the root record is rooted, as indicated by No arrow 922 also leading to block 920.

For root record 704, its is_Root flag is False and while it has a pointer to Path Cache 720, this Path Cache is no longer live. Accordingly, the root finder 206 proceeds to calculate a root path for root record 704. Because edge 706 leading to root record 702 has been removed, there is no path from root record 704 to a root of the root record graph 700. In this case, the object lifecycle engine 200 determines that the object represented by root record 704, i.e., 'myObject', is no longer reachable. In response to determining that an object is no longer reachable, the object lifecycle engine 200 may mark the root record associated with the unreachable object as invalid, as indicated at block 324 (FIG. 3B). For example, the root record builder 204 may set the is_Valid flag 514 for the root record to False. The object lifecycle engine 200 may also notify the object oriented environment 124 that the object 'myObject' has reached the end of its lifetime, as also indicated at block 324.

Figure 3C:
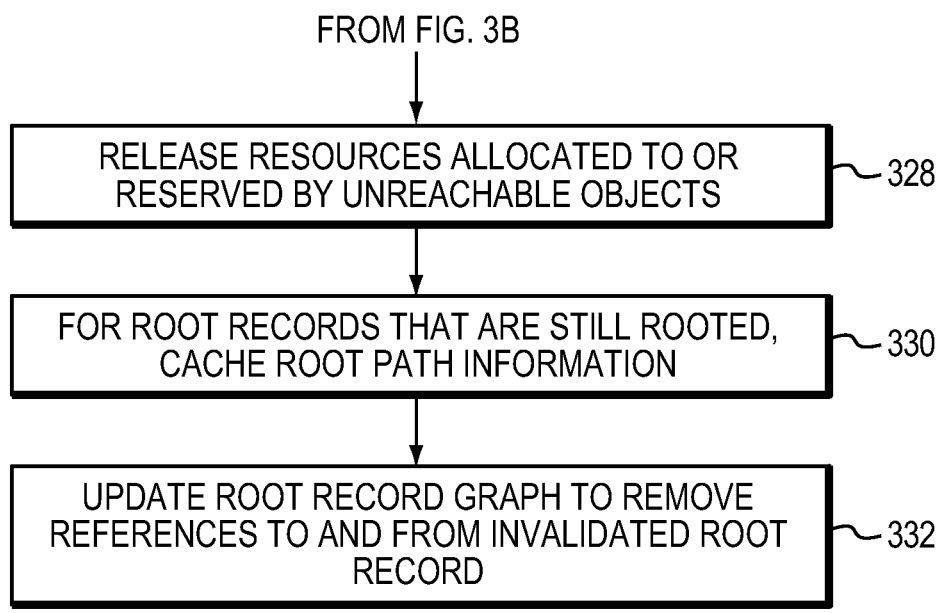

The environment 124 may take appropriate action in response to this notification from the object lifecycle engine 200. For example, if a destructor is defined for the object 'myObject', the destructor may be called by the object oriented environment 124, as indicated at block 326. In addition, all resources allocated to or reserved by the object 'myObject' may be released for use by other objects or entities of the environment 124, as indicated at block 328 (FIG. 3C).

For root record 706, while it too has a pointer to Path Cache 720, this Path Cache is no longer live. Accordingly, the root finder 206 proceeds to calculate a root path for root record 704. In this case, a root path is found from root record 706 to root record 710, which is another root of the rood record graph 700. The cache management engine 208 may cache this new root path information, as indicated at block 330. For example, the cache management engine 208 may create a new Path Cache node 722 to cache this new root path for root record 706. Furthermore, the Root Path Cache field 506 for root record 706 may be updated to point to Path Cache 722, as illustrated by arrow 730. Similarly, the Root Path Cache field 506 for root record 714 is updated to point to the new Path Cache 722, as illustrated by arrow 732.

The root record graph builder 204 also may remove edges to and from a root record that has been invalidated, as indicated at block 332. This, in turn, may result in other root records becoming un-rooted, and their corresponding objects thus deemed unreachable. That is, the root record builder 204, root finder 206 and cache management engine 208 may repeat steps 320-332, as the removal or change of a reference may result in the invalidation of more than one root record and the removal of additional edges.

In an embodiment, a reference to an object may be removed or changed in response to a number of different commands or operations in the object oriented environment 124. For example, in addition to setting a variable that previously referenced an object to a constant value, the variable may be set to a different value including null or an empty array, the element of a cell array that previously referenced an object may be set to a different value or to null, a variable may be set to another value, and a command that clears a variable may be called, among others. Similarly, a property of an object may be set to null or an empty array. When a function goes out of scope, its variables may be cleared or destroyed, and the system or environment 124 may notify the object lifecycle engine 200 that the root records representing those variables are no longer roots and that the values referenced by those variables may be considered ready for destruction.

In an embodiment, the determination of whether one or more objects have become unreachable and the actions taken if an object is determined to be unreachable, such as releasing resources, may be performed as part of the operation that led to the object becoming unreachable (the removal of a reference, a variable going out of scope, etc.). Doing so may enable the object lifecycle engine 200 to provide deterministic behavior. It is often desirable for a program make use of objects that define destructors or functions that perform actions when an object is destroyed. When such destructors are invoked as soon as an object becomes unreachable by the program, then it simpler to reason about when these destructors will be invoked and how the timing of their operations will effect program execution. In alternative systems that rely on periodic sweeping of objects that became unreachable previously, the order of destructor execution becomes much less regular in two important ways. One, the order of destructor execution of one unreachable object relative to others cannot be easily determined by understanding the program and system. Secondly, the order of execution of destructors relative to other operations within a program may depend on numerous internal and external factors including the size of memory available on the specific hardware. Thus, a programmer cannot easily reason about how destructors may interact with other parts of the program or be certain that the program will meet user requirements.

EXAMPLES

Figure 10:
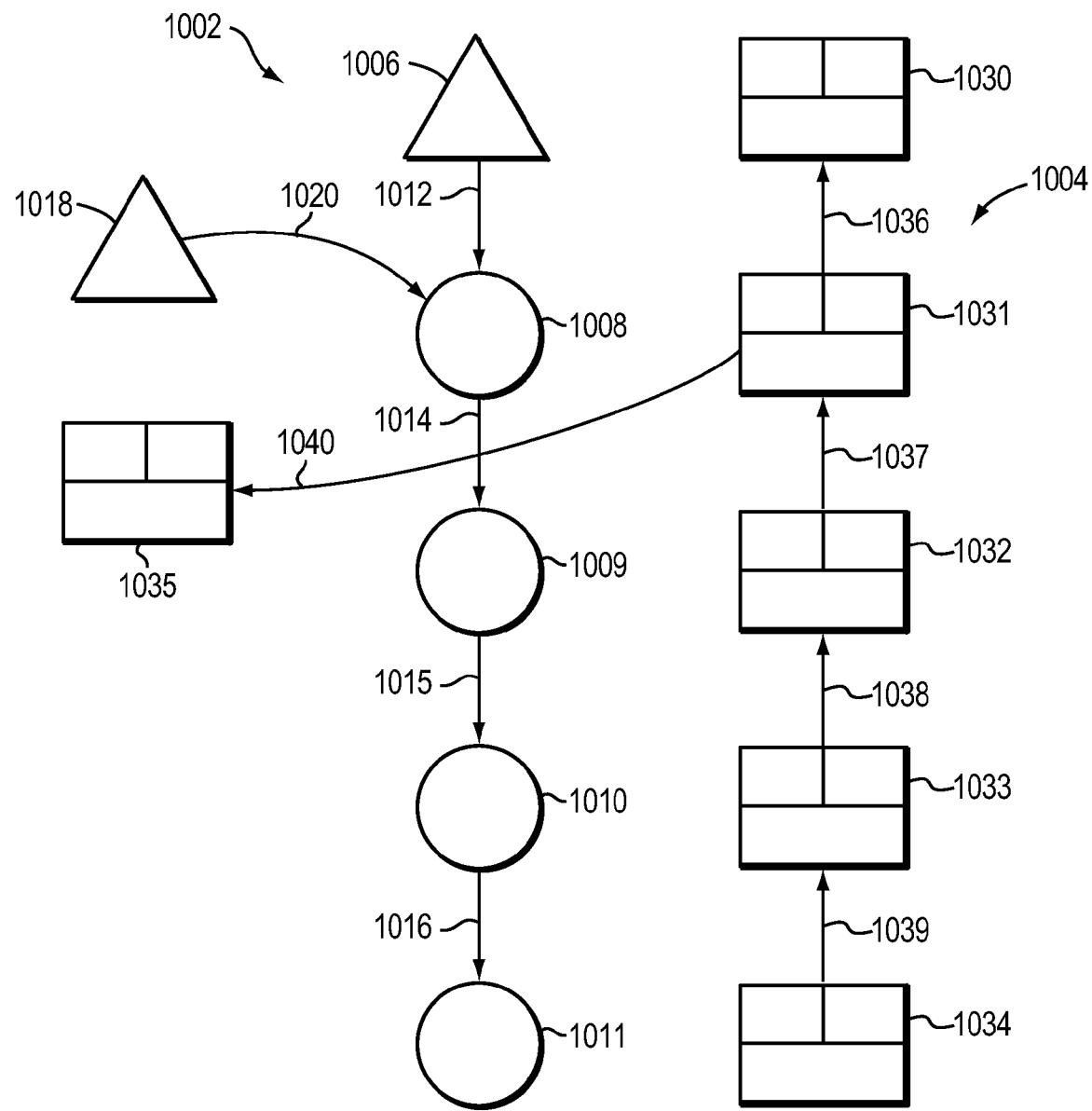
FIG. 10 is a schematic illustration of a combination object graph and root record graph illustrating a shared ring structure in accordance with an embodiment of the invention.

FIG. 10 is a schematic illustration of an object graph 1002 and a root record graph 1004 representing a variable and a sequence of object instances arranged as a linked list. The object graph 1002 includes a plurality of nodes interconnected by edges. Specifically, the object graph 1002 includes a first node 1006 that represents a first variable, and four other nodes 1008-1011 that each represents an object instance. The first variable references a first object instance as indicated by an edge 1012 from the first node 1006 to a second node 1008. Each object instance, in turn, references a next object instance as indicated by edges 1014-1016 of the object graph 1002. As indicated by additional object node 1018 and additional reference 1020, a second variable also references the object instance represented by node 1008.

The root record graph 1004 includes a plurality of root records 1030-1035 interconnected by edges 1036-1040. Specifically, the root record graph 1004 includes a root record for each node of the object graph 1002, and an edge for each edge of the object graph 1002. For example, root record 1030 corresponds to object node 1006, edge 1036 corresponds to edge 1012, root record 1031 corresponds to object node 1008, edge 1037 corresponds to edge 1014, and so on.

Suppose one or more operations are entered at the object oriented environment, e.g., through user interaction or programmatically, that modify the reference from the second variable such that the second variable steps through each object instance of the linked list sequentially from the head, e.g., node 1008, to the tail, e.g., node 1011. That is, suppose a series of operations occur such that the second variable, instead of referencing the first object instance of the linked list, references the second object instance of the linked list, then references the third object instance of the list, and so on. The object lifecycle engine 200 may be notified when the second variable 1018 is changed to reference the second object instance of the linked list, which corresponds to object node 1009. In response, the object graph builder 202 may modify the object graph 1002, and the root record graph builder 204 may in turn modify the root record graph 1004.

Figure 11:
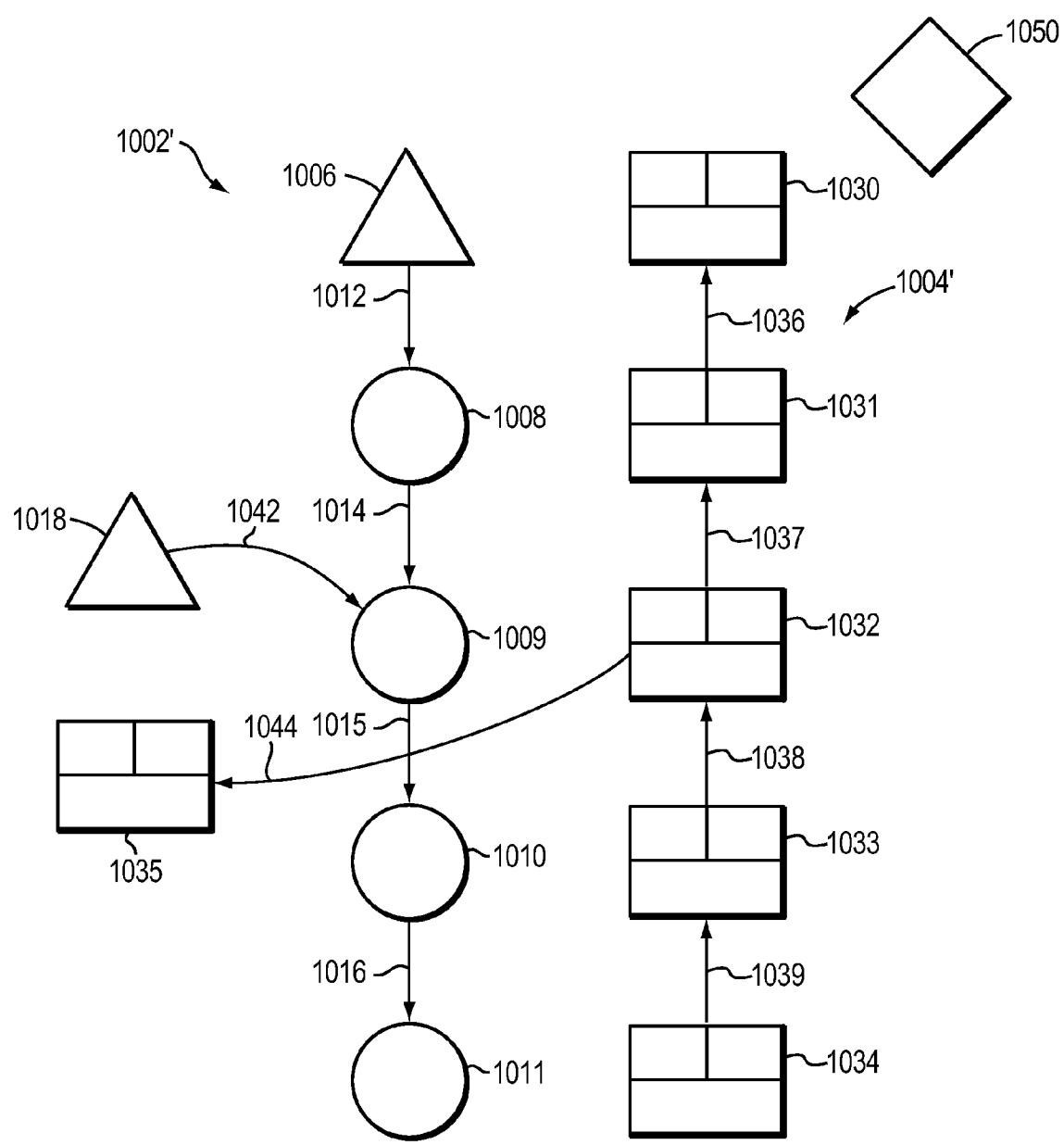
FIG. 11 is a schematic illustration of a modified object graph and a modified root record graph in accordance with an embodiment.

FIG. 11 is a schematic illustration of a modified object graph 1002' and a modified root record graph 1004'. In particular, the object graph builder 202 may remove edge 1020 (FIG. 10), which corresponded to the reference from the second variable to the first object instance of the linked list. The object graph builder 202 may add a new edge 1042 from node 1018 to node 1009 to reflect that the second variable now references the second object instance of the linked list. Similarly, the root record graph builder 204 may remove edge 1040 (FIG. 10), and add new edge 1044 from root record 1032 to root record 1035. In an embodiment, the object graph builder 202 may mark original node 1018 invalid, and add a new node (not shown) having an edge that leads to node 1009. The root record graph may be updated in a similar manner.

Because an edge of the object graph 1002 has been removed, and an edge of the root record graph 1004 has consequently been removed, the root finder 206 determines whether the affected node, i.e., object node 1008, which corresponds to the first object instance of the list, is still rooted. Specifically, the root finder 206 may analyze the modified root record graph 1004'. The root finder 206 may determine that root record 1031, which corresponds to object node 1008, has a path to root record 1030, which is a root of the modified root record graph 1004. Accordingly, the root finder 206 may determine that object node 1008 is still rooted, and therefore that the object instance that corresponds to object node 1008 has not reached the end of its lifecycle. In addition, the cache management engine 208 may cache this root path information for root record 1031, which corresponds to object node 1008, in the modified root record graph 1004'. Specifically, the cache management engine 208 may create a Path Cache node 1050 in the modified root record graph 1004', and update root record 1031 to include a pointer to the Path Cache node 1050.

Next, one or more operations may be performed such that the second variable changes its reference from the second object instance of the linked list to the third object instance of the linked list, which corresponds to object node 1010. In this case, edge 1042 from the modified object graph 1002' is removed, and edge 1044 from the modified root record graph 1004' is removed. Likewise, new edges from object node 1018 to object node 1010, and from root record 1033 to root record 1035 are added. Furthermore, because a reference to the preceding object instance of the linked list has been removed, the object lifecycle engine 200 determines whether this object instance, which corresponds to object node 1009, is still rooted. Specifically, the root finder 206 may analyze the new root record graph (not shown), to determine whether root record 1032 is still rooted. The root finder 206 may determine that root record 1032 leads to root record 1031, and that root record 1031 includes a pointer to a valid Path Cache node, i.e., node 1050. The root finder 206 may thus determine that root records 1031 and 1032 are both rooted. The cache management engine 208 also may update the root record 1032 to include a pointer to the Path Cache node 1038.

This process may be repeated as further operations are performed causing the second variable to reference different object instances of the linked list. Furthermore, by updating the respective root records to point to the Path Cache node 1050, a search of the entire root record graph may be avoided as second variable is stepped through the different object instances of the linked list. Instead, as described herein, the root finder 206 may only need to traverse one root record of the root record graph 1004 to determine that a current root record is still rooted.

Figure 12:
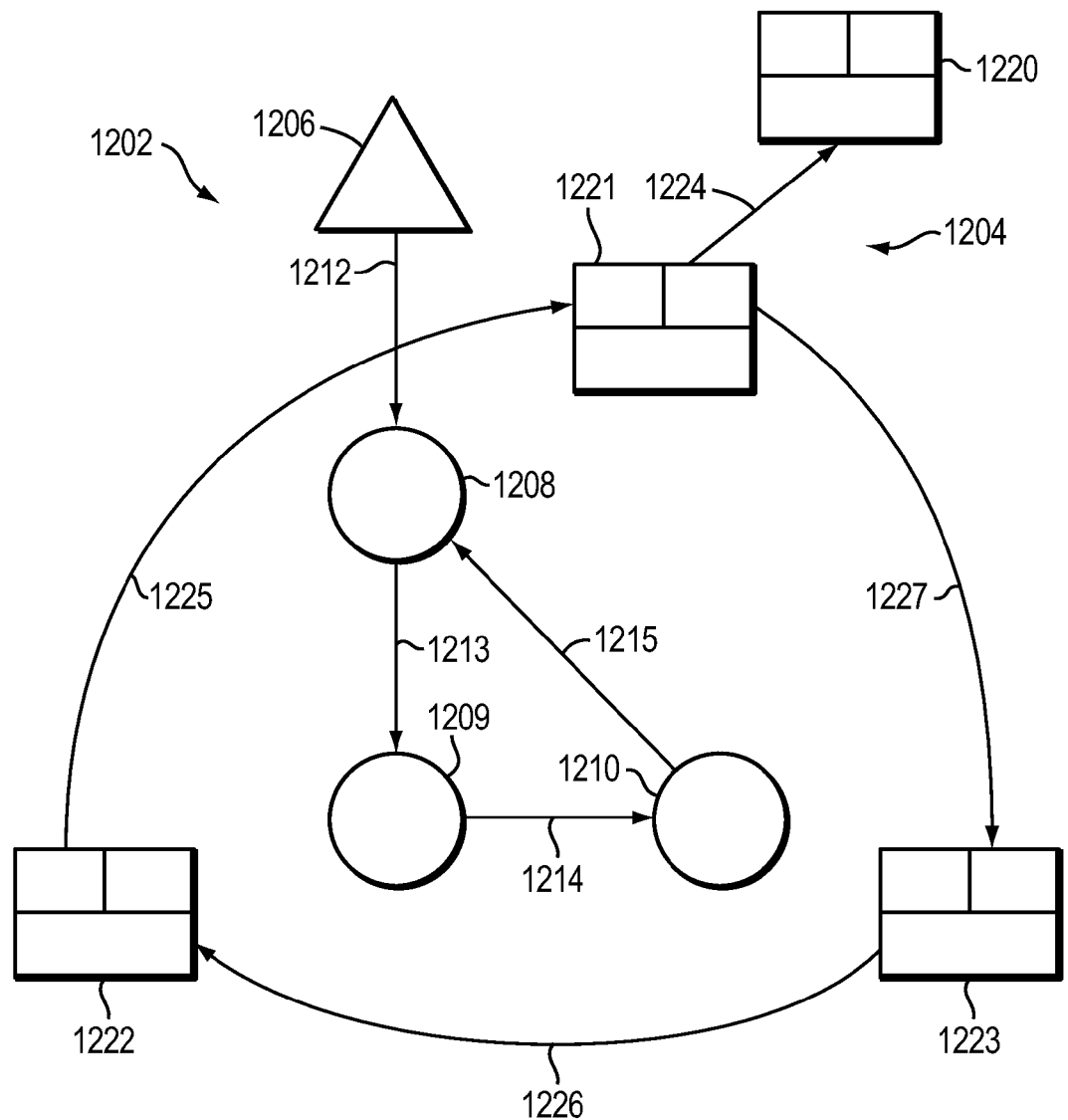
FIG. 12 is a schematic illustration of an object graph and a root record graph representing a cycle in accordance with an embodiment.

FIG. 12 is a schematic illustration of an object graph 1202 and a root record graph 1204 representing a cycle. The object graph 1202 includes a plurality of nodes interconnected by edges. Specifically, the object graph 1202 includes a first node 1206 that represents a first variable, and three other nodes 1208-1210 that each represents an object instance. The variable references a first object instance, as indicated by an edge 1212 from the first node 1206 to a second node 1208. The first object instance references a second object instance, as indicated by an edge 1213 from the second node 1208 to a third node 1209. The second object instance references a third object instance, as indicated by an edge 1214 from the third node 1209 to a fourth node 1210. The third object instance references the first object instances, as indicated by an edge 1215 from the fourth node 1210 to the first node 1208.

The root record graph 1204 includes a plurality of root records 1220-1223 interconnected by edges 1224-1227. Specifically, the root record graph 1204 includes a root record for each node of the object graph 1202, and an edge for each edge of the object graph 1202. For example, root record 1220 corresponds to object node 1206, edge 1224 corresponds to edge 1212, root record 1221 corresponds to object node 1208, edge 1225 corresponds to edge 1213, and so on.

Suppose one or more operations are entered at the object oriented environment 124, e.g., through user interaction or programmatically, that remove the reference from the variable to the first object instance. In response, the object graph builder 202 may modify the object graph 1202, and the root record graph builder 204 may in turn modify the root record graph 1204.

Figure 13:
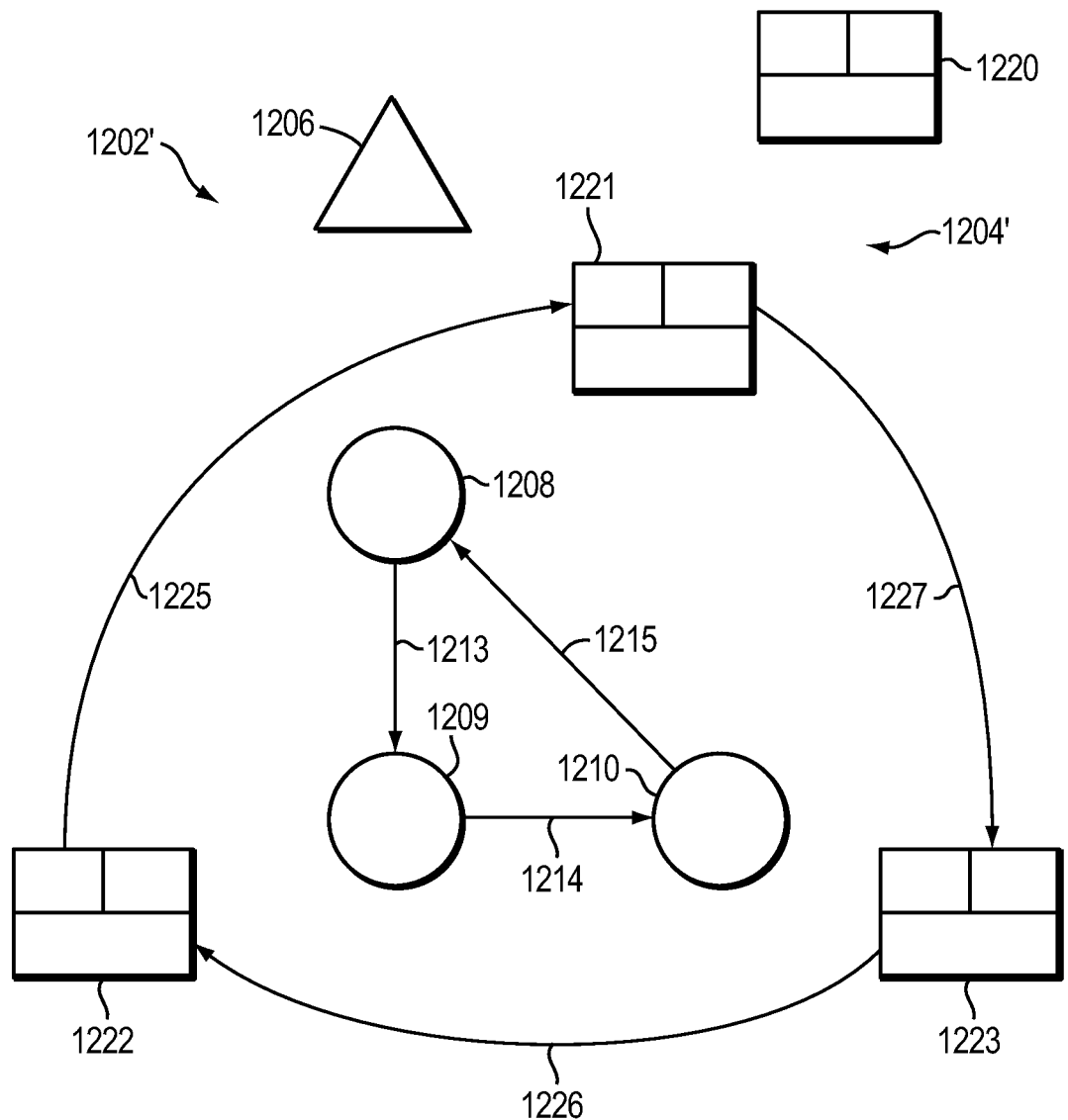
FIG. 13 is a schematic illustration of a modified object graph and a modified root record graph in accordance with an embodiment.

FIG. 13 is a schematic illustration of a modified object graph 1202' and a modified root record graph 1204'. In particular, the object graph builder 202 may remove edge 1212 (FIG. 12), which represented the reference from the variable to the first object instance of the cycle. Similarly, the root record graph builder 204 may in turn remove edge 1224 (FIG. 12). Because an edge of the object graph 1202 and the corresponding edge of the root record graph 1204 have been removed, the root finder 206 may determine whether the affected node, i.e., object node 1208, is still rooted. Specifically, the root finder 206 may analyze the modified root record graph 1204' to determine whether root record 1221, which corresponds to object node 1208, has a path to a root of the modified root record graph 1204'.

The root finder 206 may first determine that root record 1221 points to root record 1223, as a parent of root record 1221. The root finder 206 may thus proceed to examine root record 1223. Here, the root finder 206 determines that root record 1223 is not itself a root of the modified root record graph 1204', and does not have a pointer to a valid Path Cache. Nonetheless, the root finder 206 determines that root record 1223 points to root record 1222 as a parent of root record 1223. Accordingly, the root finder 206 may examine root record 1222. The root finder 206 determines that root record 1222 is not a root, and that root record 1222 does not point to a valid Path Cache.

However, the root finder 206 determines that root record 1222 points to root record 1221, as a parent of root record 1222. The root finder 206 may thus examine root record 1221. Here, the root finder 206 determines that it has already visited root record 1221 as part of its analysis of the modified root record graph 1204'. For example, as the root finder 206 examines root records of the graph, it may flag those root records that it has examined by asserting the isMarked flag 512 of the respective root record. When the root finder 206 examines root record 1221 it determines that the is_Marked flag 516 for root record 1221 is already set. In this case, the root finder 206 may determine that it has returned to the first analyzed root record without finding a root. The object lifecycle engine 200 may notify the object oriented environment 124 that the object instances of the entire cycle, e.g., the object instances corresponding to object nodes 1208-1210 have reached the end of their lifetimes.

In an alternative embodiment, the object graph builder 202 may remove or mark as invalid object node 1208, and edges 1213 and/or 1215. Similar changes may be reflected in the modified root record graph 1204' by the root record graph builder 204. In response to the removal of edges 1225 and/or 1227, the root finder 206 may determine whether root record 1222 is rooted. The root finder 206 may determine that root record 1222 is not rooted. This process may be continued, and the root finder 206 may determine that root record 1223 also is not rooted. In response to these determinations, the object lifecycle engine 200 may notify the object oriented environment 124 that the object instances corresponding to object nodes 1209 and 1210 have reached the end of their lifetimes.

Shared Ring

Figure 14:
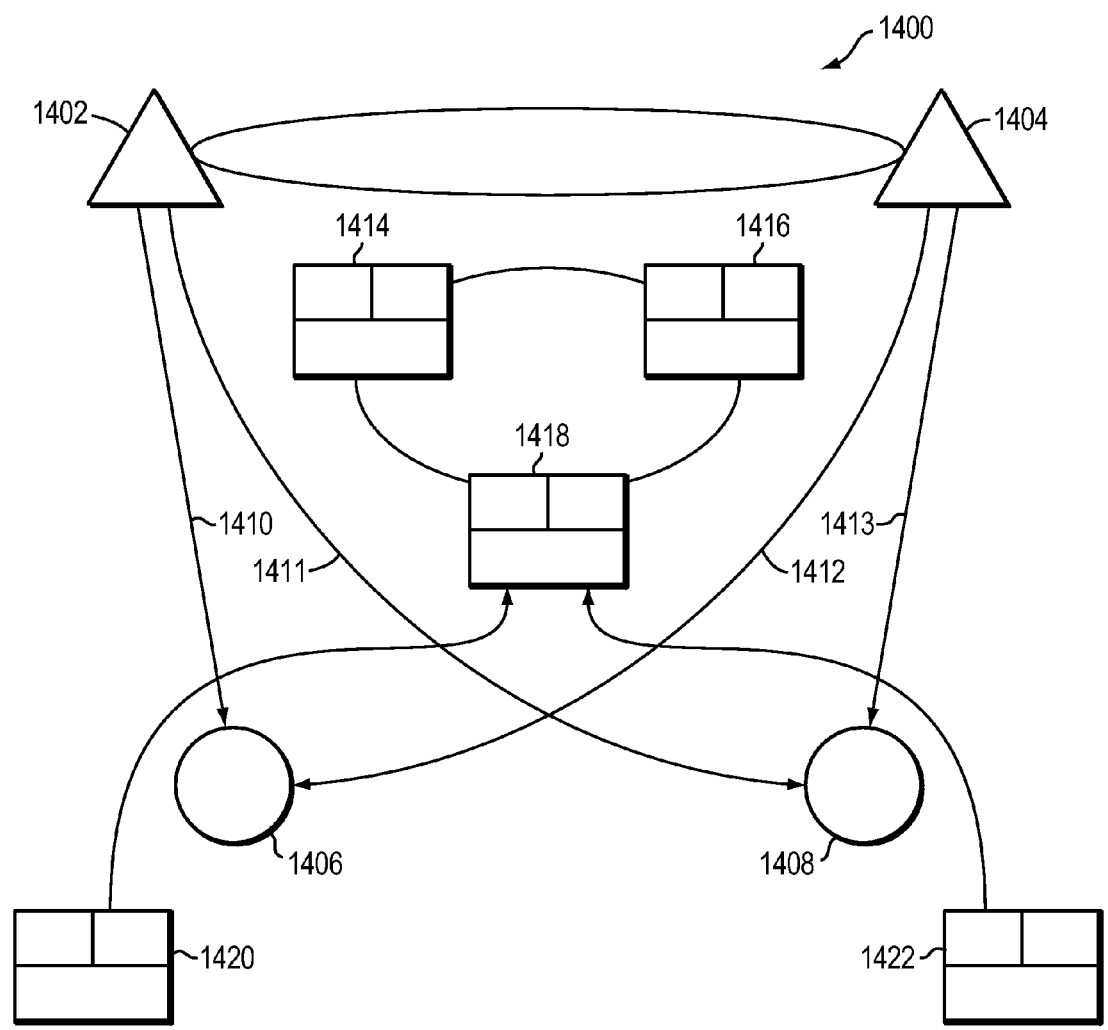
FIG. 14 is a schematic illustration of a combination object/root record graph illustrating a ring structure in accordance with an embodiment.

In an embodiment, two or more variables, such as a cell arrays, may share data. Variables that share data may be linked in the object graph 600 and the root record graph 700 in a ring structure. FIG. 14 is a schematic illustration of a combination object/root record graph 1400 illustrating a ring structure. Suppose a user enters commands for creating two variables, such as cell arrays, that both reference two objects, i.e., the variables share the objects. In response, the object graph builder 202 may create object nodes for the two variables, such as object nodes 1402, 1404, and object nodes for the two objects, such as object nodes 1406, 1408. The object graph builder 202 may also creates edges from nodes 1402, 1404 to nodes 1406, 1408, such as edges 1410-1413. The root record builder 204 may similarly create two root records 1414, 1416 that correspond to the two variables, and thus to the two object nodes 1402, 1404. Because the object nodes 1402, 1404 are part of a shared ring, the root record builder 2004 also may create a dummy root record 1418. The root record builder 204 also may create two root records 1420, 1422 for the objects represented by object graph nodes 1406, 1408. The Parents fields 502 of root records 1420, 1422, moreover, each may be loaded with pointers to the dummy root record 1418 of the ring, rather than to the root records 1414, 1416, which represent the variables corresponding to object nodes 1402, 1404. In addition, the root record builder 204 may load the Next fields 504 for the root records 1414, 1416 with pointers to the dummy root record 1418, as opposed to loading these Next fields with pointers to root records 1420, 1422. The is_Link_Dummy flag 518 of root record 1418 may be asserted to designate root record 1418 as a dummy root record of a shared ring. The parents field 406 of the 'dummy' root record 1418 may include pointers to the other root records 1414, 1416 of the ring.

Embedded System

As mentioned, the invention may be used in other systems besides the data processing system illustrated in FIG. 1. For example, the object lifecycle engine 200 may be implemented within in an embedded system. Examples of embedded systems in which the object lifecycle engine 200 may be used include mobile phones, factory automation systems, communication appliances, such as access points and modems, car systems, such as audio, navigation, driver display, engine control, and networking, cable television set-top boxes, etc.

As described above, the object lifecycle engine 200 in cooperation with the object oriented environment 124 provides a deterministic procedure for destroying unreachable objects and releasing the resources allocated to or reserved by an object that has become unreachable. The releasing of resources, moreover, may occur immediately upon the object becoming unreachable. As a result, a user, such as a programmer, utilizing the object oriented environment 124 and the object lifecycle engine 200 will know that resources allocated to or reserved by an object will be released as soon as that object becomes unreachable. The programmer may thus create an application or program in which resources reserved by a first object may be made available to a second object immediately upon the first object becoming unreachable in the application or program. For example, the programmer may create a destructor for releasing resources and performing other clean-up tasks. With the object lifecycle engine 200, the programmer, moreover, will know that the destructor will be called immediately, e.g., as a next operation, when the associated object becomes unreachable. The releasing of resources, moreover, is performed automatically by the object lifecycle engine and the object oriented environment 124, thereby freeing the programmer from having to include explicit commands to perform such clean-up operations, other than possibly including a destructor. Such a feature provides a significant advantage when operating in an embedded system where resources, such as memory, file handles, sockets, etc., are often extremely limited.

Similarly, by releasing resources of unreachable objects in a deterministic manner, embedded systems that include the object lifecycle engine 200 may be run continuously for long periods of time, e.g., months or years, without having to be periodically shut down. In embedded systems it is frequently necessary to be able to determine an upper bound on the time to perform a given operation. Garbage collection systems can interfere with the ability to establish such an upper bound because if an operation may require the garbage collector to free up resources, then the time it takes for the garbage collector to run may not be sufficiently deterministic.

In an embodiment, the nodes of the object graph 600 and the nodes of the root record graph 700 may be implemented as objects defined from, for example, an object node class, and a root record node class. Furthermore, operations performed on the nodes of the graphs 600, 700 may be implemented by performing methods supported by those objects.

Web Services

Web services are self-contained, modular applications that can be described, published, located and invoked over a network, such as the World Wide Web, using standard Internet technologies. Many web services operate in accordance with the Simple Object Access Protocol (SOAP), which defines messages for passing Remote Procedure Calls (RPCs) and data encoded by the eXtensible Mark-up Language (XML) to and from the web service. Typically, the Hyper Text Transport Protocol (HTTP) is used as the transport mechanism between the web service and the consumers of that service.

The .NET framework from Microsoft Corp. includes Visual Studio .NET, which facilitates the creation of web applications, including web services. For example, a program developer can define a class that is to be exposed as a web service. The developer then creates certain methods and declares them to be public making them available as a service. Using the Web Service Description Language (WSDL), the programmer can detail where the web service is located and how to interact with it, thereby allowing others to access and invoke the web service.

To use a web service, a proxy web service class is typically created at the consumer site based on the WSDL description of the web service. Program objects created from the proxy web service class may use SOAP over HTTP to communicate with the web service. More specifically, these objects handle the work of mapping parameters to XML elements and encapsulating the XML elements in SOAP messages for transmission to the web service. The proxy web service objects similarly recover parameters from the XML elements received in SOAP messages from the web service. A client application can then be created that interacts with the proxy web service object to specify the information to be sent to the web service and utilize the information returned from the web service. Other technologies may also be used to create and use web services.

In an embodiment, the object oriented environment 124 and/or the object lifecycle engine 200 may be implemented as a web service. For example, the object lifecycle engine 200 may be accessed, e.g., by the object oriented environment 124, as a web service that determines when objects have reached the end of their lifetimes. The functionality of the object lifecycle engine 200 thus may be located remotely relative to the object oriented environment 124, and may manage objects created by different object oriented environments. Likewise, the object oriented environment 124 may be a web service that provides one or more services to consumers. The object lifecycle engine 200 could be a part of that same web service.

In an embodiment, the object lifecycle engine 200 may be used to manage the lifetimes of components other than objects. For example, to the extent a system, such as the MATLAB technical computing environment, assigns a separate workspace to each function, and limits the scope of variables used by the function to its workspace, the object lifecycle engine 200 may manage the lifetimes of such workspaces.

In an embodiment, the object and the root record graphs 600, 700 may be combined into a single graph. For example, the object node data structures and the root record data structures may be combined into a single data structure.

In an embodiment, the object lifecycle engine 200 may run in parallel with the operation of the object oriented environment 124. For example, a multicore processor may be used such that a first processing core runs the object oriented environment 124, while a second processing core runs the object lifecycle engine 200. In another embodiment, the object lifecycle engine 200 or some part of it may run as a background process or thread relative to the object oriented environment 124. In yet another embodiment, updates to Path Cache nodes may be made on a background thread or process while changes to the rest of the graphs are only made on the same thread or threads that execute code using the objects.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to FIGS. 3A-C and 9, the order of the acts may be modified in other implementations. Further, non-dependent acts may be performed in parallel. Also, the term "user", as used herein, is intended to be broadly interpreted to include, for example, a computer or data processing system (e.g., system 100) or a user of a computer or data processing system, unless otherwise stated.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 100. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, the object oriented environment 124 may collect a set or group of object creations, and issue the set or group to the object lifecycle engine as a batch. Environment 124 may also collect a set or group of references, and send them to the object lifecycle engine 200 as a batch. The object lifecycle engine 200 may be combined with other mechanisms for determining the end of an object's lifecycle. For example, the object lifecycle engine may be combined with the mechanism described in U.S. Pat. No. 7,237,237. In an embodiment, a language interpreter, compiler, or just-in-time compiler may determine lifecycles of certain objects based on static or dynamic analysis of scripts or programs being executed while the object lifecycle engine may be used to determine object lifecycles for all other objects. Therefore, it is the object of the appended claims to cover all such variations and modifications as come within the true spirit and scope of the invention.

What is claimed is:
1. A computer-implemented method comprising:
 storing objects, constructed in an object-oriented programming environment, in a first computer memory of a computer system, the objects allocated system resources of the computer system;

building a root record graph, the root record graph being a directed graph including nodes and edges linking the nodes, at least some of the nodes associated with root records for the objects constructed in the object oriented programming environment, the root record graph including one or more roots;

configuring the edges of the root record graph to point in an opposite direction relative to references to the objects, the references to the objects defined in the object-oriented programming environment;

storing the root record graph in one of the first computer memory and a second computer memory;

removing a first reference of the references to a first object of the objects;

in response to the removal of the first reference to the first object:
locating within the root record graph a first node of the nodes, the first node associated with a first root record of the root records for the first object, and
updating the root record graph to reflect the removal of the first reference to the first object,
determining, from the updated root record graph, whether the first node associated with the first root record for the first object remains linked to at least one of the one or more roots of the root record graph; and
if the first node associated with the first root record for the first object is not linked to the at least one of the one or more roots of the root record graph, destroying the first object to release for reuse a first system resource of the system resources allocated to the first object.

2. The computer-implemented method of claim 1 further comprising, if the first node associated with the first root record for the first object is linked to the at least one of the one or more roots of the root record graph, caching root information for the first node associated with the first root record for the first object.

3. The computer-implemented method of claim 1 wherein at least one of the root records includes:
a first field that references a set of parent root records, and
a second field indicating whether the at least one root record is associated with one of the one or more roots of the root record graph.

4. The computer-implemented method of claim 3 wherein the first node associated with the first root record for the first object is determined to be linked to the one of the one or more roots of the root record graph when the first node associated with the first root record for the first object is linked to a second node associated with a second root record of the root record whose second field indicates that the second root record represents one of the one or more roots of the root record graph.

5. The computer-implemented method of claim 1 wherein the root records are created when the objects associated with the root records are created.

6. The computer-implemented method of claim 1 further comprising:
releasing the first system resource allocated to the first object when the first node associated with the first root record for the first object is not reachable from the at least one of the one or more roots.

7. The computer-implemented method of claim 1 wherein the determining includes traversing the root record graph from the first node associated with the first root record for the first object toward at least one of the one or more roots.

8. The computer-implemented method of claim 7 wherein the traversing of the root record graph is a depth first search.

9. The computer-implemented method of claim 1 wherein at least one of the one or more roots of the root record graph is associated with a variable defined in the object-oriented programming environment.

10. The computer-implemented method of claim 1 further comprising:
storing one or more variables in one of the first computer memory, the second computer memory, and a third computer memory;
building an object graph that represents (i) the objects and (ii) one or more of the references defined within the object-oriented programming environment among the objects and the one or more variables; and
utilizing the object graph to build the root record graph.

11. The computer-implemented method of claim 1 wherein the destroying includes calling a destructor for the first object.

12. The computer-implemented method of claim 1 wherein the removing is implemented through one or more operations or one or more procedures, and the locating, the updating, and the determining are part of the one or more operations or the one or more procedures.

13. A computer-implemented method for determining an end of life condition of an object, the method comprising:
providing a workspace in which one or more variables are defined;
defining objects in an object oriented environment, the objects allocated system resources of a computer system;
establishing, within the object oriented environment, a plurality of variable-to-object references and a plurality of object-to-object references;
building an object graph including nodes and edges linking the nodes, a first node of the nodes being associated with either a respective variable defined in the workspace or a respective object defined in the object oriented environment, and a first edge of the edges being associated with either a respective variable-to-object reference or a respective object-to-object reference established within the object oriented environment;
storing the object graph in a computer memory of the computer system;
building a root record graph including root record nodes and root record edges linking the root record nodes, at least some of the root record nodes associated with root records for either the variables defined in the workspace or the objects defined in the object oriented environment, and the root record edges being associated with the plurality of variable-to-object references or the plurality of object-to-object references established within the object oriented environment, the root record graph including one or more roots;
configuring the root record edges to point in an opposite direction relative to the plurality of variable-to-object references and the plurality of object-to-object references;
storing the root record graph in the computer memory;
detecting an occurrence of an operation in the object oriented environment that removes either a first variable-to-object reference of the plurality of variable-to-object references or a first object-to-object reference of the plurality of object-to-objects to a first object of the object oriented environment;

in response to the detecting:
locating within the root record graph a first root record node of the root record nodes associated with a first root record of the root records for the first object,
deleting a first root record edge of the root record edges of the root record graph associated with the first variable-to-object reference or the first object-to-object reference, and
determining, after the deleting the first root record edge, whether the first root record node associated with the first root record for the first object is linked to at least one of the one or more roots of the root record graph by traversing the root record graph from the first root record node associated with the first root record for the first object; and
if the first root record node associated with the first root record for the first object is not linked to the at least one of the one or more roots of the root record graph, designating the first object as reaching an end of life condition to release for reuse a first system resource of the system resources allocated to the first object.

14. The computer-implemented method of claim 13 further comprising:
creating a cache including a pointer to a second root record node of the root record nodes that represents one of the one or more roots of the root record graph; and
storing a cache reference to the cache in a third root record node of the root record nodes that is in a path of the root record graph between the first root record node associated with the first root record for the first object and the second root record node that represents the one of the one or more roots of the root record graph.

15. The computer-implemented method of claim 14 further comprising:
invalidating the cache in response to an update to the root record graph that breaks the path to the second root record node that represents the one of the one or more roots of the root record graph.

16. A computer-implemented method for determining an end of life condition of a first object, the method comprising:
providing a workspace in which one or more variables are defined;
defining objects including the first object in an object oriented environment, the objects allocated system resources of a computer system;
establishing, within the object oriented environment, a plurality of variable-to-object references and a plurality of object-to-object references;
building an object graph including nodes and edges between the nodes, the nodes being associated with either the variables defined in the workspace or the objects defined in the object oriented environment, and the edges being associated with either the plurality of variable-to-object references or the plurality of object-to-object references established within the object oriented environment;
storing the object graph in a computer memory of the computer system;
building a root record graph including root record nodes and root record edges linking the root record nodes, the root record nodes associated with the one or more variables or the objects, the root record graph including one or more roots;
configuring the root record edges to point in an opposite direction relative to the plurality of variable-to-object references and the plurality of object-to-object references established within the object oriented environment;
storing the root record graph in the computer memory;
detecting an occurrence of an operation in the object oriented environment that removes either a first variable-to-object reference of the plurality of variable-to-object references to the first object or a first object-to-object reference of the plurality of object-to-object references to the first object of the object oriented environment;
in response to the detecting:
changing the object graph,
locating within the root record graph a first root record node of the root record nodes associated with the first object,
updating the root record graph to reflect the change in the object graph, and
determining, after the root record graph has been updated, whether the first root record node associated with the first object is linked to at least one of the one or more roots of the root record graph by traversing the root record graph; and
if the first root record node associated with the first object is not linked to the at least one of the one or more roots of the root record graph, designating the first object as reaching an end of life condition to release for reuse a first system resource of the system resources allocated to the first object.

17. The computer-implemented method of claim 16 wherein the changing, the locating, the updating, and the determining are performed in a deterministic manner relative to the detecting.

18. The computer-implemented method of claim 16 wherein the occurrence includes a given variable of the one or more variables going out of a scope of the workspace in which the given variable was defined.

19. The computer-implemented method of claim 16 further comprising:
creating a cache including a pointer to a second root record node of the root record nodes that represents one of the one or more roots of the root record graph; and
storing a cache reference to the cache in a third root record node of the root record nodes that is in a path of the root record graph between the first root record node associated with the first object and the second root record node that represents the one of the one or more roots of the root record graph.

20. The computer-implemented method of claim 17 further comprising calling a destructor for the first object.

21. A non-transitory computer-readable medium comprising program instructions, the program instructions when executed by a processing element operable to:
create, within an object-oriented environment, objects, the objects allocated system resources of a computer system;
build a root record graph, the root record graph being a directed graph including nodes and edges linking the nodes, at least some of the nodes associated with root records for the objects, the root record graph including one or more roots;
configure the edges of the root record graph to point in an opposite direction relative to references to the objects, the references to the objects defined in the object-oriented programming environment;
store the root record graph in a memory of the computer system;

remove a first reference of the references to a first object;
in response to the first reference to the first object being removed:
  locate within the root record graph, by a processor coupled to the memory, a first node of the nodes associated with a first root record for the first object,
  identify, by the processor, a first edge of the edges from the first node that corresponds to the first reference, and
  remove, by the processor, the first edge from the root record graph to create an updated root record graph,
determine, from the updated root record graph, whether the first node associated with the first root record for the first object remains linked to at least one of the one or more roots of the root record graph; and
if the first node associated with the first root record for the first object is not linked to the at least one of the one or more roots of the root record graph, destroy the first object to release for reuse a first system resource allocated to the first object.

22. The computer-readable medium of claim 21 wherein at least one of the one or more roots of the root record graph correspond to a variable.

23. The computer-readable medium of claim 21 further comprising program instructions to:
cache information for a path in the root record graph from the first node to the at least one of the one or more roots.

24. The computer-readable medium of claim 23 further comprising program instructions to:
check the cache information to determine whether the first node associated with the first root record for the first object remains linked to the at least one of the one or more roots.

25. The computer-readable medium of claim 21 further comprising program instructions to:
traverse the root record graph from the first node to at least one of the one or more roots to determine whether the first node associated with the first root record for the first object remains linked to the at least one of the one or more roots.

26. An apparatus comprising:
processing logic coupled to a memory of a computer system,
wherein the processing logic is programmed to:
  store objects, constructed in an object-oriented programming environment, in the memory, the objects allocated system resources of the computer system;
  build a root record graph, the root record graph being a directed graph including nodes and edges linking the nodes, at least some of the nodes associated with root records for the objects, the root record graph including one or more roots;
  configure the edges of the root record graph to point in an opposite direction relative to references to the objects, the references to the objects defined in the object-oriented programming environment;
  remove a first reference of the references to a first object;
  in response to the first reference to the first object being removed:
    locate within the root record graph a first node of the nodes associated with a first root record for the first object,
    identify a first edge of the edges from the first node that corresponds to the first reference, and
    remove the first edge from the root record graph to create an updated root record graph,
  determine, from the updated root record graph, whether the first node associated with the first root record for the first object remains linked to at least one of the one or more roots of the root record graph; and
  if the first node associated with the first root record for the first object is not linked to the at least one of the one or more roots of the root record graph, destroy the first object to release for reuse a first system resource allocated to the first object.

27. The apparatus of claim 26 wherein the processing logic is further configured to:
cache information identifying a path in the root record graph from the first node to the at least one of the one or more roots.

28. The apparatus of claim 27 wherein the processing logic is further configured to:
check the cache information to determine whether the first node associated with the first root record for the first object remains linked to the at least one of the one or more roots.

29. The apparatus of claim 26 wherein the processing logic is further configured to:
traverse the root record graph from the first node to the at least one of the one or more roots to determine whether the first node associated with the first root record for the first object remains linked to the at least one of the one or more roots.

30. The computer-implemented method of claim 1 wherein the system resources include one or more of a system memory, a file handle, a socket, a handle to a device, a file handle, a slot in a table, and one of the objects.

31. The computer-implemented method of claim 13 wherein the system resources include one or more of a system memory, a file handle, a socket, a handle to a device, a file handle, a slot in a table, and one of the objects.

32. The computer-implemented method of claim 17 wherein the system resources include one or more of a system memory, a file handle, a socket, a handle to a device, a file handle, a slot in a table, and one of the objects.

33. The computer-readable medium of claim 21 wherein the system resources include one or more of a system memory, a file handle, a socket, a handle to a device, a file handle, a slot in a table, and one of the objects.

34. The apparatus of claim 26 wherein the system resources include one or more of a system memory, a file handle, a socket, a handle to a device, a file handle, a slot in a table, and one of the objects.

* * * * *

UNITED STATES PATENT AND TRADEMARK OFFICE
CERTIFICATE OF CORRECTION

PATENT NO. : 9,600,411 B2
APPLICATION NO. : 13/077338
DATED : March 21, 2017
INVENTOR(S) : David A. Foti Page 1 of 1

It is certified that error appears in the above-identified patent and that said Letters Patent is hereby corrected as shown below:

In the Specification

Column 10, Lines 59-67 reads:
"x=myObject;                     (1)
x.prop_1=mySecondObject;         (2)
y=x.prop_1;                      (3)
y.prop_1=myThirdObject;          (4)
x.prop_2=y.prop_1;               (5)"
Should read:
--(1)    x=myObject;
  (2)    x.prop_1=mySecondObject;
  (3)    y=x.prop_1;
  (4)    y.prop_1=myThirdObject;
  (5)    x.prop_2=y.prop_1;--

In the Claims

Claim 4, Column 25, Line 50 reads:
"of the root record whose second field indicates that the"
Should read:
--of the root records whose second field indicates that the--

Claim 20, Column 28, Line 49 reads:
"20. The computer-implemented method of claim 17 fur-"
Should read:
--20. The computer-implemented method of claim 16 fur- --

Signed and Sealed this
Fourteenth Day of May, 2019

Andrei Iancu
*Director of the United States Patent and Trademark Office*